(12) United States Patent
Kurokawa et al.

(10) Patent No.: US 10,509,268 B2
(45) Date of Patent: Dec. 17, 2019

(54) DISPLAY DEVICE

(71) Applicant: Japan Display Inc., Minato-ku (JP)

(72) Inventors: Tae Kurokawa, Minato-ku (JP);
Kentaro Okuyama, Minato-ku (JP);
Takayuki Imai, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/943,890

(22) Filed: Apr. 3, 2018

(65) Prior Publication Data

US 2018/0292690 A1 Oct. 11, 2018

(30) Foreign Application Priority Data

Apr. 10, 2017 (JP) .................. 2017-077835

(51) Int. Cl.
*G02F 1/1343* (2006.01)
*G02F 1/1334* (2006.01)
*G02F 1/1335* (2006.01)
*G09G 3/34* (2006.01)

(52) U.S. Cl.
CPC .......... *G02F 1/1343* (2013.01); *G02F 1/1334* (2013.01); *G02F 1/133615* (2013.01); *G02F 1/133621* (2013.01); *G02F 2001/133622* (2013.01); *G09G 3/342* (2013.01); *G09G 3/3413* (2013.01); *G09G 2310/024* (2013.01); *G09G 2310/0235* (2013.01)

(58) Field of Classification Search
CPC .................................................... G02F 1/1343
See application file for complete search history.

(56) References Cited

U.S. PATENT DOCUMENTS

| 2008/0062297 | A1 | 3/2008 | Sako et al. |
| 2010/0013739 | A1 | 1/2010 | Sako et al. |
| 2014/0232834 | A1* | 8/2014 | Sato ..................... G02B 27/225 |
| | | | 348/51 |
| 2015/0055055 | A1* | 2/2015 | Ebisui ................... G02F 1/1334 |
| | | | 349/61 |
| 2016/0116768 | A1 | 4/2016 | Okuyama et al. |
| 2017/0219840 | A1 | 8/2017 | Okuyama |
| 2018/0074356 | A1 | 3/2018 | Okuyama |
| 2018/0240418 | A1* | 8/2018 | Kobayashi ............... G09G 3/34 |

FOREIGN PATENT DOCUMENTS

| JP | 4961914 | 6/2012 |
| JP | 5228305 | 7/2013 |
| JP | 5309448 | 10/2013 |
| JP | 2016-085452 | 5/2016 |

* cited by examiner

*Primary Examiner* — Edmond C Lau
(74) *Attorney, Agent, or Firm* — Oblon, McClelland, Maier & Neustadt, L.L.P.

(57) ABSTRACT

According to an aspect, a display device includes: a first translucent substrate; a second translucent substrate facing the first translucent substrate; a liquid crystal layer including polymer dispersed liquid crystal sealed between the first translucent substrate and the second translucent substrate; at least one light emitter facing at least one of a side surface of the first translucent substrate or a side surface of the second translucent substrate; and a display controller that controls transmittance of light passing through the first translucent substrate and the second translucent substrate. A non-light-emitting period in which the at least one light emitter does not emit light is provided between a plurality of light-emitting periods in which the at least one light emitter emits light.

15 Claims, 25 Drawing Sheets

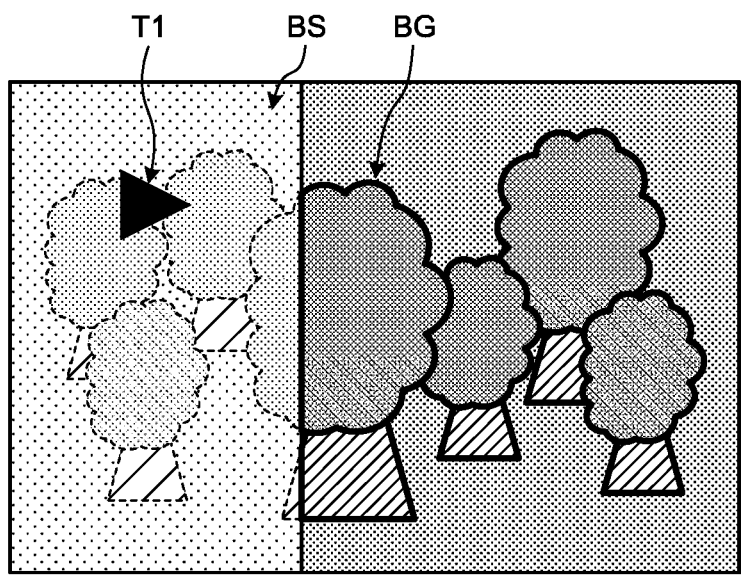

DISPLAY DEVICE

CROSS-REFERENCE TO RELATED APPLICATIONS

This application claims priority from Japanese Application No. 2017-077835, filed on Apr. 10, 2017, the contents of which are incorporated by reference herein in its entirety.

BACKGROUND

1. Technical Field

The present disclosure relates to a display device.

2. Description of the Related Art

Japanese Patent Application Laid-open Publication No. 2016-085452 describes a display device including a light modulation layer and a light source. In this display device, the light modulation layer is disposed between a pair of transparent substrates and includes a plurality of light modulation elements that have predetermined refractive index anisotropy and are different in responsiveness to an electric field generated by electrodes provided on the transparent substrates. The light source emits light of a predetermined color into the light modulation layer through a side surface of the light modulation layer. The light modulation layer transmits the incident light received from the light source when the electric field is not generated, and scatters the incident light and emits the scattered light to the transparent substrates when the electric field is generated.

SUMMARY

According to an aspect, a display device includes: a first translucent substrate; a second translucent substrate facing the first translucent substrate; a liquid crystal layer including polymer dispersed liquid crystal sealed between the first translucent substrate and the second translucent substrate; at least one light emitter facing at least one of a side surface of the first translucent substrate or a side surface of the second translucent substrate; and a display controller that controls transmittance of light passing through the first translucent substrate and the second translucent substrate. A non-light-emitting period in which the at least one light emitter does not emit light is provided between a plurality of light-emitting periods in which the at least one light emitter emits light.

BRIEF DESCRIPTION OF THE DRAWINGS

FIG. 21 is a diagram for explaining still another example in which the external light is scattered to control the transmittance in the processing region surrounding the image;

FIG. 22 is a diagram for explaining a plurality of regions obtained by dividing a display region;

DETAILED DESCRIPTION

Figure 1:
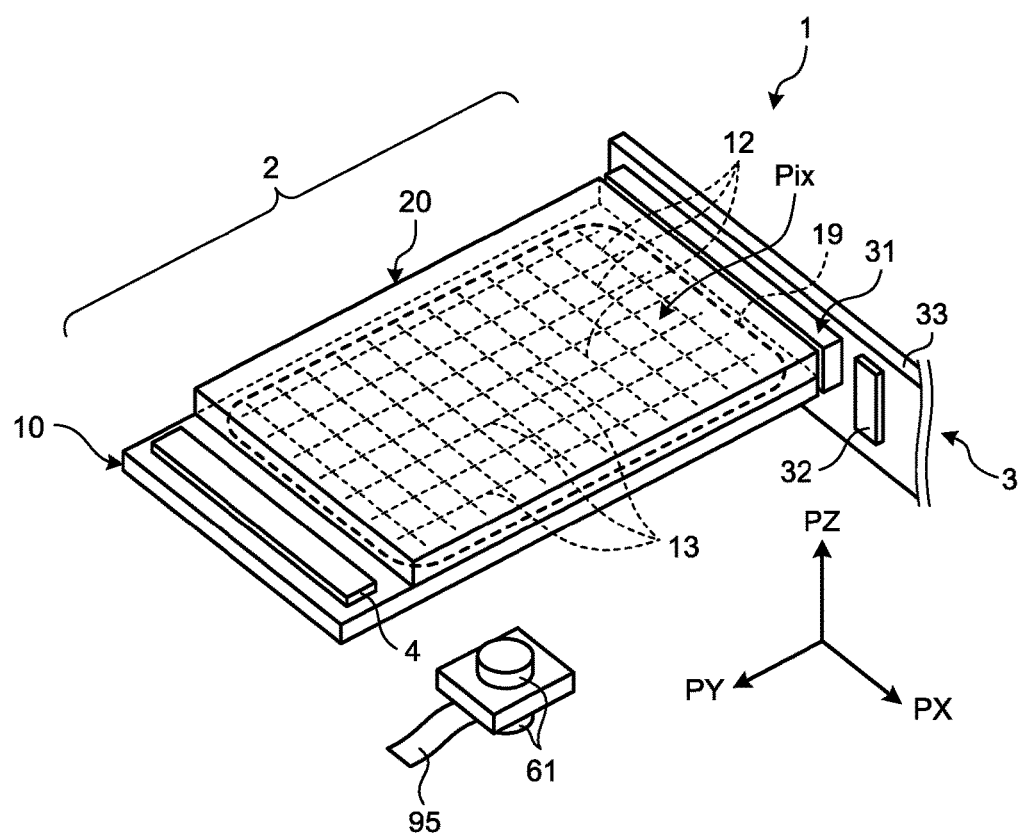
FIG. 1 is a perspective view illustrating an example of a display device according to an embodiment of the present disclosure.

Exemplary aspects (embodiments) according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the disclosure. In the specification and the figures, components similar to those previously described with reference to a preceding figure are denoted by like reference numerals, and detailed explanation thereof will be appropriately omitted. In this disclosure, when an element A is described as being "on" another element B, the element A can be directly on the other element B, or there can be one or more elements between the element A and the other element B.

Figure 2:
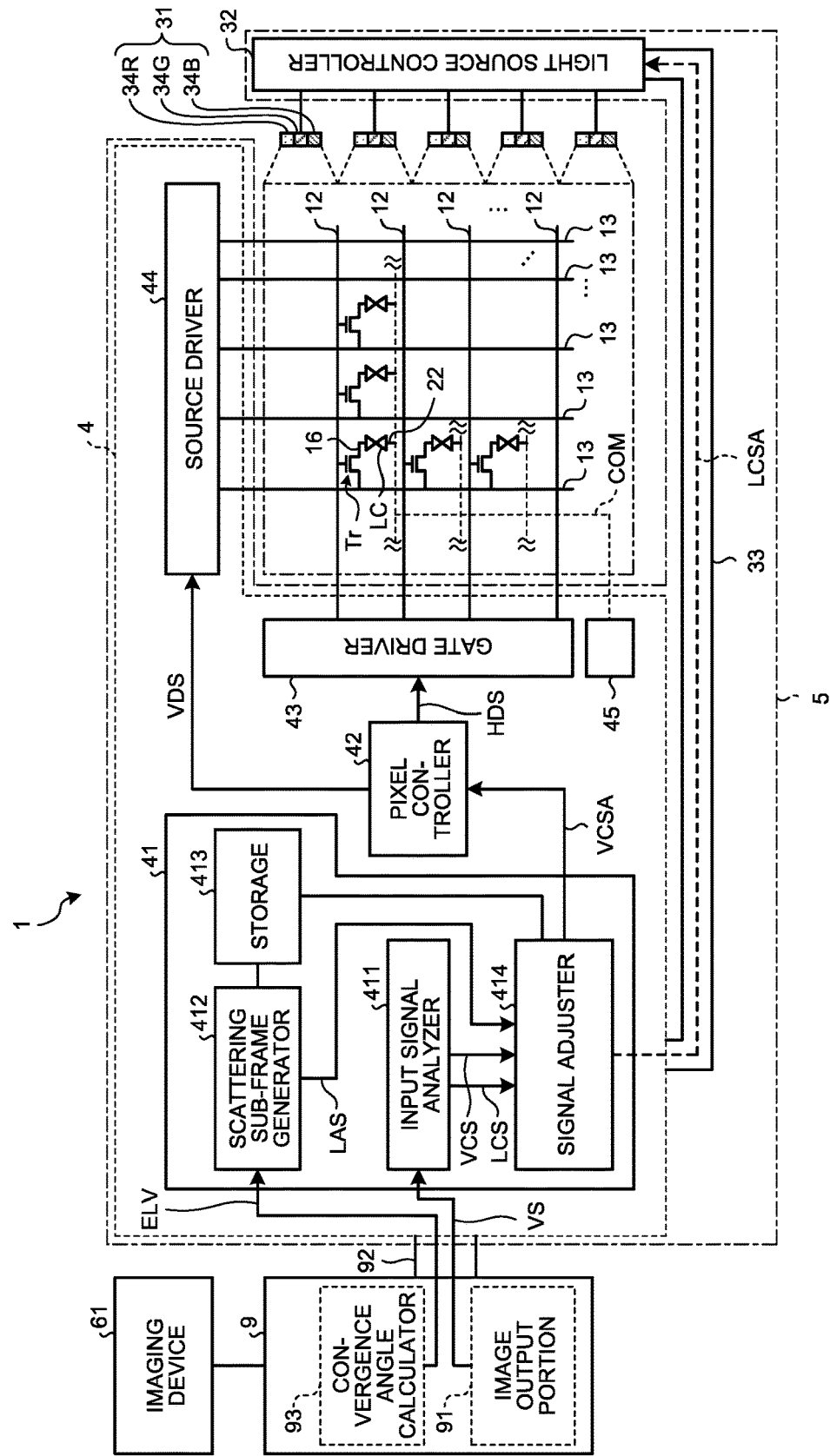
FIG. 2 is a block diagram illustrating the display device of FIG. 1.
Figure 3:
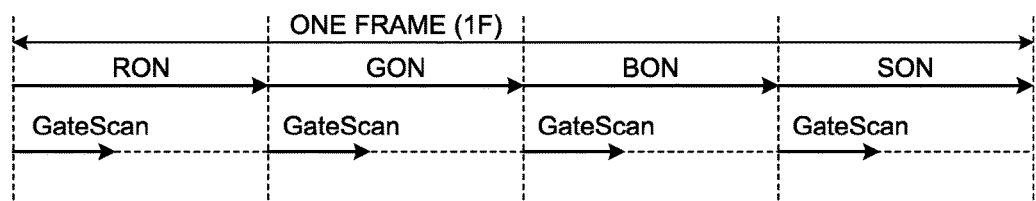
FIG. 3 is a timing chart for explaining timing of light emission by a light source in a field-sequential system.

FIG. 1 is a perspective view illustrating an example of a display device according to an embodiment. FIG. 2 is a block diagram illustrating the display device of FIG. 1. FIG. 3 is a timing chart for explaining timing of light emission by a light source in a field-sequential system.

As illustrated in FIG. 1, a display device 1 includes a display panel 2, a light source 3, a drive circuit 4 constituting a part of a display controller 5 (refer to FIG. 2) to be described later, imaging devices 61, and a higher-level controller 9 (refer to FIG. 2). A PX direction denotes one direction of the display panel 2. A PY direction denotes a direction orthogonal to the PX direction. A PZ direction denotes a direction orthogonal to a PX-PY plane.

Figure 5:
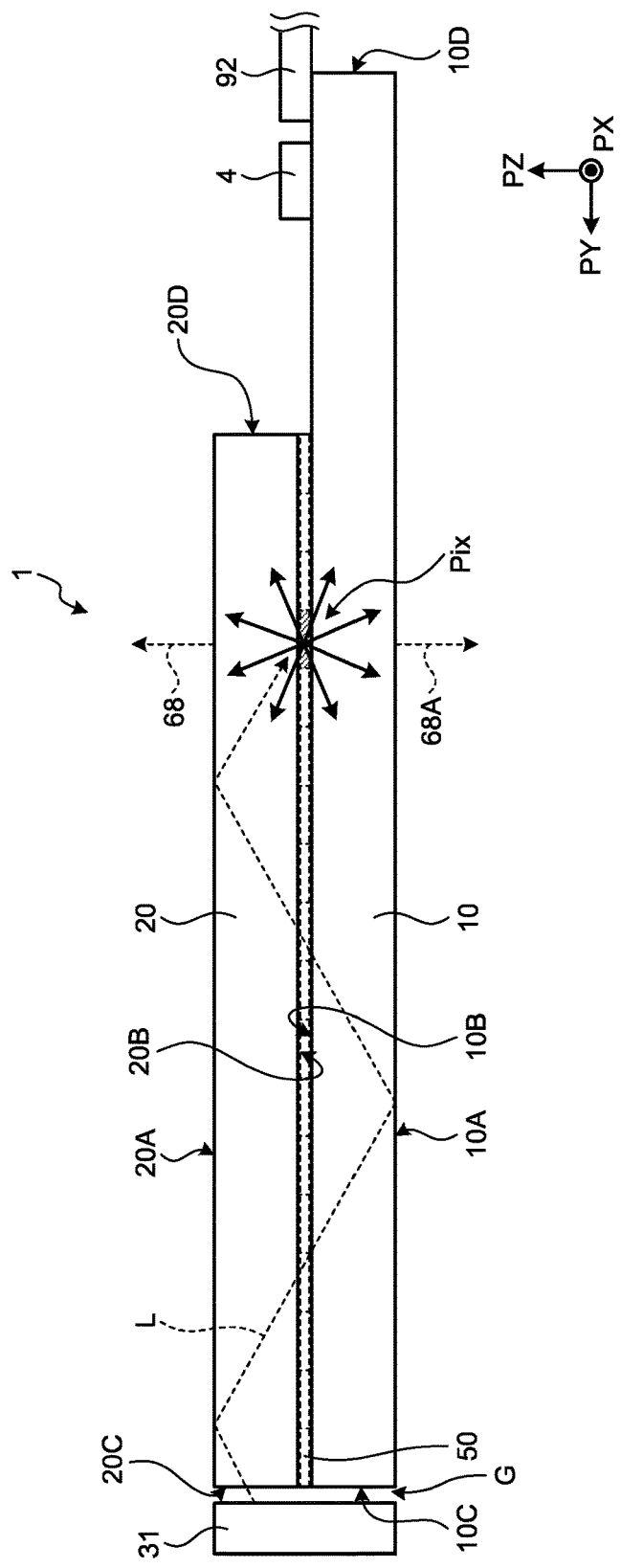
FIG. 5 is a sectional view illustrating an exemplary section of the display device of FIG. 1.

The display panel 2 includes a first translucent substrate 10, a second translucent substrate 20, and a liquid crystal layer 50 (refer to FIG. 5). The second translucent substrate 20 faces a surface of the first translucent substrate 10 in a direction orthogonal to the surface of the first translucent substrate 10 (in the PZ direction in FIG. 1). Polymer dispersed liquid crystal (to be described later) is sealed in the liquid crystal layer 50 (refer to FIG. 5) with the first translucent substrate 10, the second translucent substrate 20, and a sealing part 19.

As illustrated in FIG. 1, the inside of the sealing part 19 in the display panel 2 serves as a display region. A plurality of pixels Pix are arranged in a matrix in the display region. In the present disclosure, a row refers to a pixel row including m pixels Pix arranged in one direction, and a column refers to a pixel column including n pixels Pix arranged in a direction orthogonal to the direction in which the rows are arranged. The values of m and n are determined according to display resolution in the vertical direction and that in the horizontal direction. A plurality of scanning lines 12 are arranged row by row, and a plurality of signal lines 13 are arranged column by column.

The light source 3 includes a light emitter 31. As illustrated in FIG. 2, a light source controller 32, a light source substrate 33 on which the light emitter 31 and the light source controller 5 are disposed, and the drive circuit 4 constitute the display controller 5. The light source substrate 33 is a flexible substrate, and serves also as wiring for electrically coupling the light source controller 32 to the drive circuit 4 (refer to FIG. 2). The light emitter 31 is electrically coupled to the light source controller 32 through the wiring in the light source substrate 33.

Each of the imaging devices 61 includes, for example, a complementary metal-oxide-semiconductor (CMOS) image sensor or a charge-coupled device (CCD) image sensor. The imaging devices 61 can capture images in the PZ direction. The imaging devices 61 are provided on both sides in the PZ direction, and can each capture an image on either of the first translucent substrate 10 side or the second translucent substrate 20 side, which serves as a background side.

The imaging devices 61 are coupled to the higher-level controller 9 through a flexible substrate 95 illustrated in FIG. 1, which can transmit information on the images captured by the imaging devices 61 to the higher-level controller 9.

In the present embodiment, one of the imaging devices 61 captures an image on a viewer side, and the other of the imaging devices 61 captures an image on the background side. The display panel 2 can be viewed from one side to the other side in the PZ direction, and can also be viewed from the other side to the one side in the PZ direction. Therefore, one of the imaging devices 61 may capture the image on the background side, and the other of the imaging devices 61 may capture the image on the viewer side.

The higher-level controller 9 includes, for example, a central processing unit (CPU), a random access memory (RAM), and a read-only memory (ROM). The higher-level controller 9 uses the CPU to implement various functions, such as functions of an image output portion 91 and a convergence angle calculator 93.

In accordance with a video signal supplied from the outside, the higher-level controller 9 supplies an input signal VS for displaying an image on the display panel 2 from the image output portion 91 to the drive circuit 4 through a flexible substrate 92.

The higher-level controller 9 uses the convergence angle calculator 93 to calculate an angle of convergence based on the position of eyes of the viewer captured by the imaging device 61. The higher-level controller 9 supplies a signal ELV of the convergence angle information from the convergence angle calculator 93 to the drive circuit 4 through the flexible substrate 92.

As illustrated in FIG. 1, the drive circuit 4 is fixed to the surface of the first translucent substrate 10. As illustrated in FIG. 2, the drive circuit 4 includes an analyzer 41, a pixel controller 42, a gate driver 43, a source driver 44, and a common potential driver 45. The first translucent substrate 10 has an area larger than that of the second translucent substrate 20 in the PX-PY plane, and the drive circuit 4 is provided on an overhang of the first translucent substrate 10 exposed from the second translucent substrate 20.

The analyzer 41 receives the input signal (e.g., a red-green-blue (RGB) signal) VS and the signal ELV of the convergence angle information, which have been described above.

The analyzer 41 includes an input signal analyzer 411, a scattering sub-frame generator 412, a storage 413, and a signal adjuster 414. The input signal analyzer 411 generates a first pixel input signal VCS and a light source control signal LCS in accordance with the input signal VS supplied from the outside. The light source control signal LCS is a signal including information on a light quantity of the light emitter 31 set according to, for example, input gradation values given to all the pixels Pix. For example, the light quantity of the light emitter 31 is set smaller when a darker image is displayed, and set larger when a brighter image is displayed.

The first pixel input signal VCS is a signal for determining a gradation value to be given to each of the pixels Pix of the display panel 2 in accordance with the input signal VS. In other words, the first pixel input signal VCS is a signal including gradation information on the gradation value of each of the pixels Pix. The pixel controller 42 performs correction processing, such as gamma correction and expansion processing, on each of the input gradation values of the first pixel input signal VCS to set an output gradation value.

The scattering sub-frame generator 412 receives the signal ELV of the convergence angle information mentioned above. The scattering sub-frame generator 412 generates an adjustment signal LAS according to the position of an image stored in the storage 413 and the signal ELV of the convergence angle information. The scattering sub-frame generator 412 partitions a processing region corresponding to a region surrounding the image, and calculates a gradation value according to a scattering rate in the partitioned processing range. The adjustment signal LAS includes the gradation value according to the scattering rate of the background in the processing range.

The signal adjuster 414 generates a light source control signal LCSA according to the adjustment signal LAS during a period obtained by adding a scattering sub-frame period to a plurality of sub-frame periods for the light source control signal LCS, and transmits the light source control signal LCSA to the light source controller 32. The signal adjuster 414 generates a second pixel input signal VCSA from the first pixel input signal VCS according to the adjustment signal LAS such that a predetermined gradation value is output to the above-described processing range during the above-described sub-frame periods, and transmits the second pixel input signal VCSA to the pixel controller 42.

The pixel controller 42 generates a horizontal drive signal HDS and a vertical drive signal VDS in accordance with the second pixel input signal VCSA. In the present embodiment, since the display device 1 is driven by the field-sequential system, the horizontal drive signal HDS and the vertical drive signal VDS are generated for each color that can be emitted by the light emitter 31.

The gate driver 43 sequentially selects the scanning lines 12 of the display panel 2 in accordance with the horizontal drive signal HDS during one vertical scanning period. The scanning lines 12 can be selected in any order.

The source driver 44 supplies a gradation signal according to the output gradation value of each of the pixels Pix to corresponding one of the signal lines 13 of the display panel 2, in accordance with the vertical drive signal VDS during one horizontal scanning period.

In the present embodiment, the display panel 2 is an active-matrix panel. Hence, the display panel 2 includes the signal (source) lines 13 extending in the PX direction and the scanning (gate) lines 12 extending in the PY direction in a plan view, and includes switching elements Tr at intersections between the respective signal lines 13 and the respective scanning lines 12.

A thin-film transistor is used for each switching element Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to each of the signal lines 13, and the gate electrode of the switching element Tr is coupled to each of the scanning lines 12. The other of the source electrode and the drain electrode is coupled to one end of a liquid crystal capacitor LC. The liquid crystal capacitor LC is coupled at one end thereof to the switching element Tr through a pixel electrode 16, and coupled at the other end thereof to a common potential COM through a common electrode 22. The common potential COM is supplied from the common potential driver 45.

The light emitter 31 includes a light emitter 34R of a first color (e.g., red), a light emitter 34G of a second color (e.g., green), and a light emitter 34B of a third color (e.g., blue). The light source controller 32 controls the light emitter 34R of the first color to emit light, the light emitter 34G of the second color to emit light, and the light emitter 34B of the third color to emit light in a time-division manner, in accordance with the light source control signal LCSA. In this manner, the light emitter 34R of the first color, the light emitter 34G of the second color, and the light emitter 34B of the third color are driven by the field-sequential system. The light emitters 34R, 34G, and 34B are, for example, light-emitting diodes (LEDs).

As illustrated in FIG. 3, during a first sub-frame (first period) RON, the light emitter 34R of the first color emits light, and some of the pixels Pix selected during one vertical scanning period GateScan scatter light to perform display. At this time, on the entire display panel 2, if the gradation signal according to the output gradation value of each of the pixels Pix is supplied to the above-described signal lines 13 for the pixels Pix selected during this one vertical scanning period GateScan, only the first color is lit up.

Then, during a second sub-frame (second period) GON, the light emitter 34G of the second color emits light, and some of the pixels Pix selected during one vertical scanning period GateScan scatter light to perform display. At this time, on the entire display panel 2, if the gradation signal according to the output gradation value of each of the pixels Pix is supplied to the above-described signal lines 13 for the pixels Pix selected during this one vertical scanning period GateScan, only the second color is lit up.

Further, during a third sub-frame (third period) BON, the light emitter 34B of the third color emits light, and some of the pixels Pix selected during one vertical scanning period GateScan scatter light to perform display. At this time, on the entire display panel 2, if the gradation signal according to the output gradation value of each of the pixels Pix is supplied to the above-described signal lines 13 for the pixels Pix selected during this one vertical scanning period GateScan, only the third color is lit up. As described above, each of the first sub-frame RON, the second sub-frame GON, and the third sub-frame BON is a light-emitting period in which the light emitter 31 emits light.

The eyes of a human have a limited temporal resolution, and see an afterimage. Thus, the eyes of a human recognize a synthesized image of three colors in one-frame period (1F). The field-sequential system can eliminate the need for a color filter, and thus can suppress an absorption loss by the color filter. As a result, higher transmittance can be obtained. In the color filter system, the pixel Pix is divided into sub-pixels of the first color, the second color, and the third color, so that the sub-pixels constitute one pixel Pix. In contrast, in the field-sequential system, since the pixel need not be divided into the sub-pixels in such a manner, the resolution can be easily increased.

External light enters the display panel 2. The external light is also scattered in each of the pixels Pix according to an applied voltage, and is emitted as emission light 68. During a scattering sub-frame (fourth period or fourth sub-frame) SON, none of the light emitters 34R, 34G, and 34B of the light emitter 31 emits light, and some of the pixels Pix selected during one vertical scanning period GateScan scatter the external light. At this time, if a predetermined gradation signal is supplied to the signal lines 13 for the pixels Pix selected during this one vertical scanning period GateScan, a predetermined voltage is applied to each of the pixels Pix. As a result, the degree of scattering in the pixel changes with the applied voltage, and the transmittance of the display panel 2 becomes predetermined transmittance. The transmittance of the display panel 2 refers to transmittance of light passing through the first translucent substrate 10 and the second translucent substrate 20. The transmittance of light passing through the first translucent substrate 10 and the second translucent substrate 20 may be simply called the transmittance in this specification. The display controller 5 can control the transmittance of the light passing through the first translucent substrate 10 and the second translucent substrate 20. The scattering sub-frame SON is a non-light-emitting period in which the light emitter 31 does not emit light.

In FIG. 3, the processing is performed in the scattering sub-frame SON after the first sub-frame RON in which the light emitter 34R of the first color emits light, the second sub-frame GON in which the light emitter 34G of the second color emits light, and the third sub-frame BON in which the light emitter 34B of the third color emits light. But the present disclosure is not limited to this order. The processing may be performed in the scattering sub-frame SON between the first sub-frame RON and the second sub-frame GON, between the second sub-frame GON and the third sub-frame BON, or between the third sub-frame BON and the first sub-frame RON.

Figure 4:
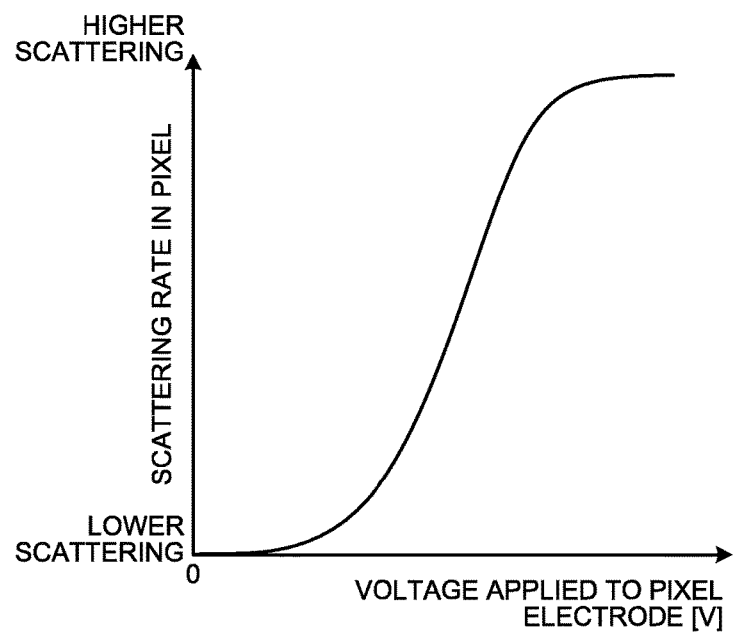
FIG. 4 is a graph illustrating a relation between a voltage applied to a pixel electrode and a scattering state of a pixel.
Figure 6:
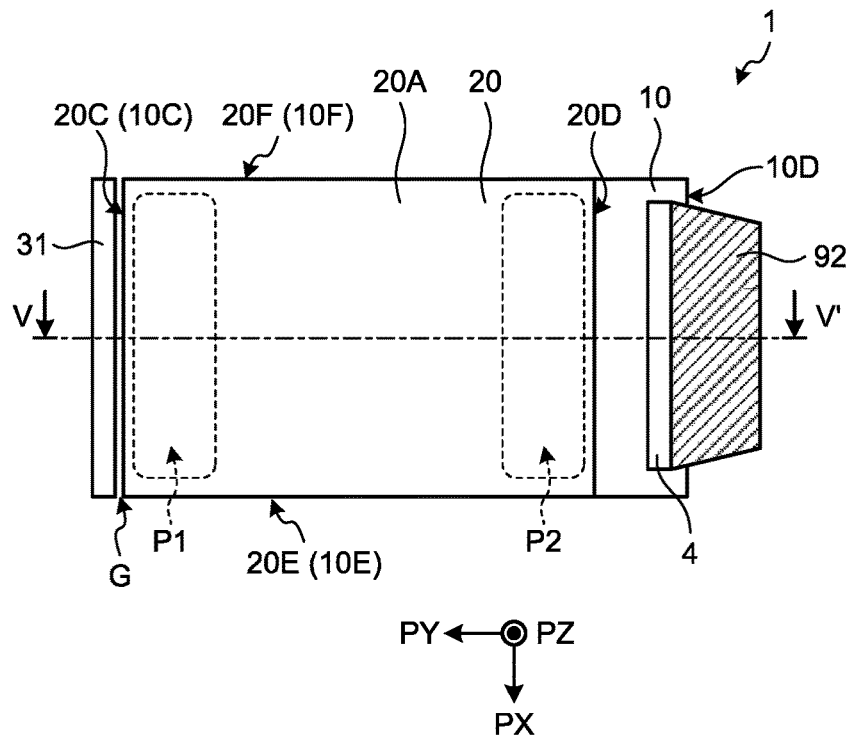
FIG. 6 is a plan view illustrating a plane of the display device of FIG. 1.
Figure 7:
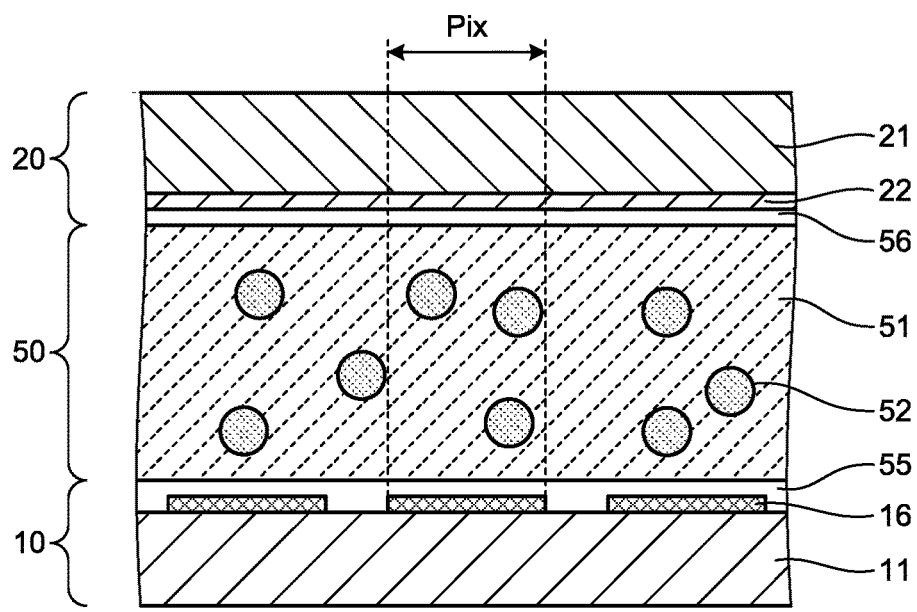
FIG. 7 is an enlarged sectional view obtained by enlarging a liquid crystal layer of FIG. 5.
Figure 8:
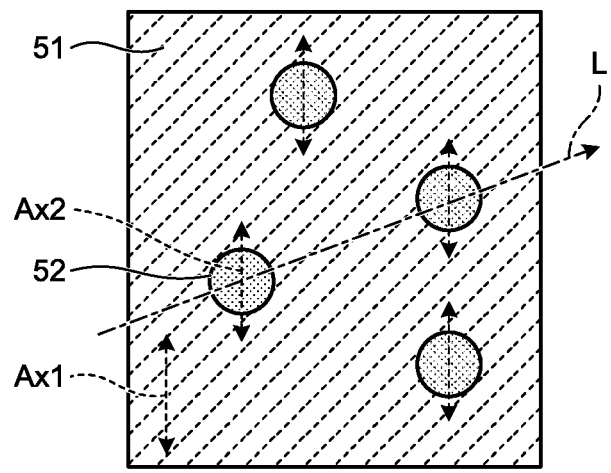
FIG. 8 is a sectional view for explaining a non-scattering state in the liquid crystal layer.
Figure 9:
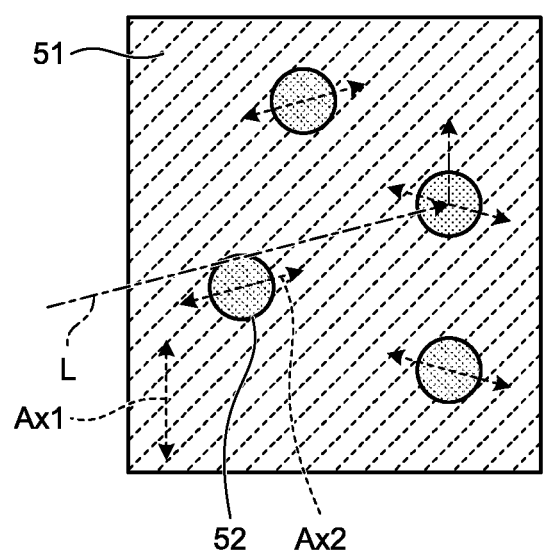
FIG. 9 is a sectional view for explaining the scattering state in the liquid crystal layer.

FIG. 4 is an explanatory diagram illustrating a relation between a voltage applied to the pixel electrode and a scattering state of the pixel. FIG. 5 is a sectional view illustrating an exemplary section of the display device of FIG. 1. FIG. 6 is a plan view illustrating a plane of the display device of FIG. 1. Specifically, FIG. 5 illustrates a V-V' section of FIG. 6. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal according to the output gradation value of each of the pixels Pix is supplied to the above-described signal lines 13 for the pixels Pix selected during one vertical scanning period GateScan, the voltage applied to the pixel electrode 16 changes with the gradation signal. The change in the voltage applied to the pixel electrode 16 changes the voltage between the pixel electrode 16 and the common electrode 22. The scattering state of the liquid crystal layer 50 for each of the pixels Pix is controlled according to the voltage applied to the pixel electrode 16, and the scattering rate in the pixel Pix changes, as illustrated in FIG. 4. In this manner, the display controller 5 sequentially applies a voltage to the pixel electrode 16 according to the gradation value of each of the first color, the second color, and the third color in the second pixel input signal VCSA in synchronization with the emission of the light of the first color, the light of the second color, or the light of the third color described above. The display device 1 thus displays the image. As will be described later, during the scattering sub-frame (fourth sub-frame) SON in which the light emitter 31 does not emit light, the display controller 5 applies the voltage to the pixel electrode 16 according to a gazing distance in the processing region in which no image is displayed. In this specification, a first applied voltage denotes the voltage applied to the pixel electrode 16 according to the above-described gradation signal by the display controller 5 during the first sub-frame RON to the third sub-frame GON; and a second applied voltage denotes the voltage applied to the pixel electrode 16 by the display controller 5 during the scattering sub-frame SON. The second applied voltage is the voltage applied to the pixel electrode 16 according to the gazing distance.

As illustrated in FIGS. 5 and 6, the first translucent substrate 10 has a first principal surface 10A, a second principal surface 10B, a first side surface 10C, a second side surface 10D, a third side surface 10E, and a fourth side surface 10F. The first principal surface 10A and the second principal surface 10B are parallel surfaces. The first side surface 10C and the second side surface 10D are parallel surfaces. The third side surface 10E and the fourth side surface 10F are parallel surfaces.

As illustrated in FIGS. 5 and 6, the second translucent substrate 20 has a first principal surface 20A, a second principal surface 20B, a first side surface 20C, a second side surface 20D, a third side surface 20E, and a fourth side surface 20F. The first principal surface 20A and the second principal surface 20B are parallel surfaces. The first side surface 20C and the second side surface 20D are parallel surfaces. The third side surface 20E and the fourth side surface 20F are parallel surfaces.

As illustrated in FIGS. 5 and 6, the light emitter 31 faces the first side surface 20C of the second translucent substrate 20. As illustrated in FIG. 5, the light emitter 31 emits light-source light L to the first side surface 20C of the second translucent substrate 20. The first side surface 20C of the second translucent substrate 20 facing the light emitter 31 serves as a light incident surface. A gap G is provided between the light emitter 31 and the light incident surface. The gap G forms an air layer.

As illustrated in FIG. 5, the light-source light L emitted from the light emitter 31 propagates in a direction away from the first side surface 20C while being reflected by the first principal surface 10A of the first translucent substrate 10 and the first principal surface 20A of the second translucent substrate 20. When the light-source light L travels from the first principal surface 10A of the first translucent substrate 10 or the first principal surface 20A of the second translucent substrate 20 to the outside, the light-source light L travels from a medium from a higher refractive index to a medium having a lower refractive index. Hence, if the incident angle of the light-source light L incident on the first principal surface 10A of the first translucent substrate 10 or the first principal surface 20A of the second translucent substrate 20 is larger than a critical angle, the light-source light L is fully reflected by the first principal surface 10A of the first translucent substrate 10 or the first principal surface 20A of the second translucent substrate 20.

As illustrated in FIG. 5, the light-source light L that has propagated in the first translucent substrate 10 and the second translucent substrate 20 is scattered by any of the pixels Pix including liquid crystal in the scattering state, and the incident angle of the scattered light becomes an angle smaller than the critical angle. Thus, emission light 68 or 68A is emitted outward from the first principal surface 10A of the first translucent substrate 10 or the first principal surface 20A of the second translucent substrate 20. The emission light 68 or 68A emitted to the outside from the first principal surface 10A of the first translucent substrate 10 or the first principal surface 20A of the second translucent substrate 20 is viewed by the viewer. In the present disclosure, a value representing a luminance level of the emission light 68 or the emission light 68A in the pixel Pix is called an emission luminance gradation value. The following describes the polymer dispersed liquid crystal in the scattering state and the polymer dispersed liquid crystal in the non-scattering state, using FIGS. 7 to 9.

As illustrated in FIG. 7, the first translucent substrate 10 is provided with a first orientation film 55, and the second translucent substrate 20 is provided with a second orientation film 56. The first and the second orientation films 55 and 56 are vertical orientation films, for example.

A solution obtained by dispersing liquid crystal molecules in monomers is sealed between the first translucent substrate 10 and the second translucent substrate 20. Subsequently, in a state where the monomers and the liquid crystal molecules are oriented by the first and the second orientation films 55 and 56, the monomers are polymerized by ultraviolet rays or heat to form a bulk 51. This process forms the liquid crystal layer 50 including the reverse-mode polymer dispersed liquid crystal in which the liquid crystal is dispersed in gaps of a polymer network formed in a mesh manner.

In this way, the liquid crystal layer 50 includes the bulk 51 formed of the polymer and a plurality of fine particles 52 dispersed in the bulk 51. The fine particles 52 include the liquid crystal molecules. Both the bulk 51 and the fine particles 52 have optical anisotropy.

The orientation of the liquid crystal molecules included in the fine particles 52 is controlled by a voltage difference between the pixel electrode 16 and the common electrode 22. The orientation of the liquid crystal molecules is changed by the voltage applied to the pixel electrode 16. The degree of scattering of light passing through the pixel Pix changes in accordance with the change of the orientation of the liquid crystal molecules.

For example, as illustrated in FIG. 8, the direction of an optical axis Ax1 of the bulk 51 is the same as the direction of an optical axis Ax2 of the fine particles 52 when no voltage is applied between the pixel electrode 16 and the common electrode 22. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether the voltage is applied.

An ordinary-ray refractive index of the bulk 51 and that of the fine particles 52 are equal to each other. When no voltage is applied between the pixel electrode 16 and the common electrode 22, the difference in refractive index between the bulk 51 and the fine particles 52 is zero in all directions. The liquid crystal layer 50 is placed in the non-scattering state of not scattering the light-source light L. The light-source light L propagates in a direction away from the light emitter 31 while being reflected by the first principal surface 10A of the first translucent substrate 10 and the first principal surface 20A of the second translucent substrate 20. When the liquid crystal layer 50 is in the non-scattering state of not scattering the light-source light L, a background on the first principal surface 20A side of the second translucent substrate 20 is visible from the first principal surface 10A of the first translucent substrate 10, and a background on the first principal surface 10A side of the first translucent substrate 10 is visible from the first principal surface 20A of the second translucent substrate 20.

As illustrated in FIG. 9, the optical axis Ax2 of the fine particle 52 is inclined by an electric field formed between the pixel electrode 16 and the common electrode 22 to which a voltage is applied. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode 16 to which a voltage is applied. As described above, the viewer views a part of the scattered light-source light L emitted outward from the first principal surface 10A of the first translucent substrate 10 or the first principal surface 20A of the second translucent substrate 20.

In the pixel Pix including the pixel electrode 16 to which no voltage is applied, the background on the first principal surface 20A side of the second translucent substrate 20 is visible from the first principal surface 10A of the first translucent substrate 10, and the background on the first principal surface 10A side of the first translucent substrate 10 is visible from the first principal surface 20A of the second translucent substrate 20. In the display device 1 of the present embodiment, when the input signal VS is input from the image output portion 91, the voltage is applied to the pixel electrode 16 of the pixel Pix to display an image, and the image in accordance with the second pixel input signal VCSA becomes visible together with the background.

The light-source light L is scattered in the pixel Pix including the pixel electrode 16 to which a voltage is applied, and emitted outward, so that an image is superimposed on the background to be displayed. In other words, the display device 1 of the present embodiment superimposes the image on the background by combining the emission light 68 and the emission light 68A with the background to display the image.

Figure 10:
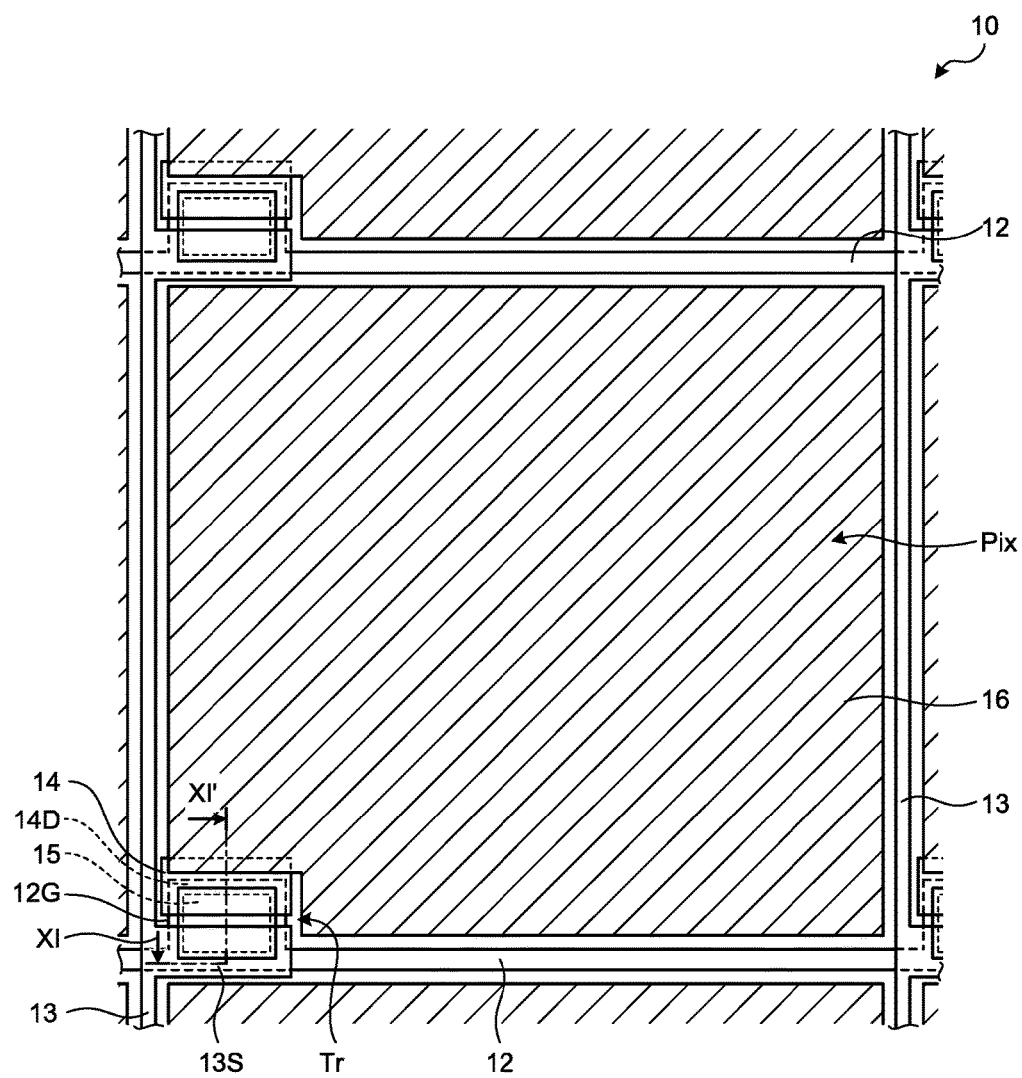
FIG. 10 is a plan view illustrating the pixel.
Figure 11:
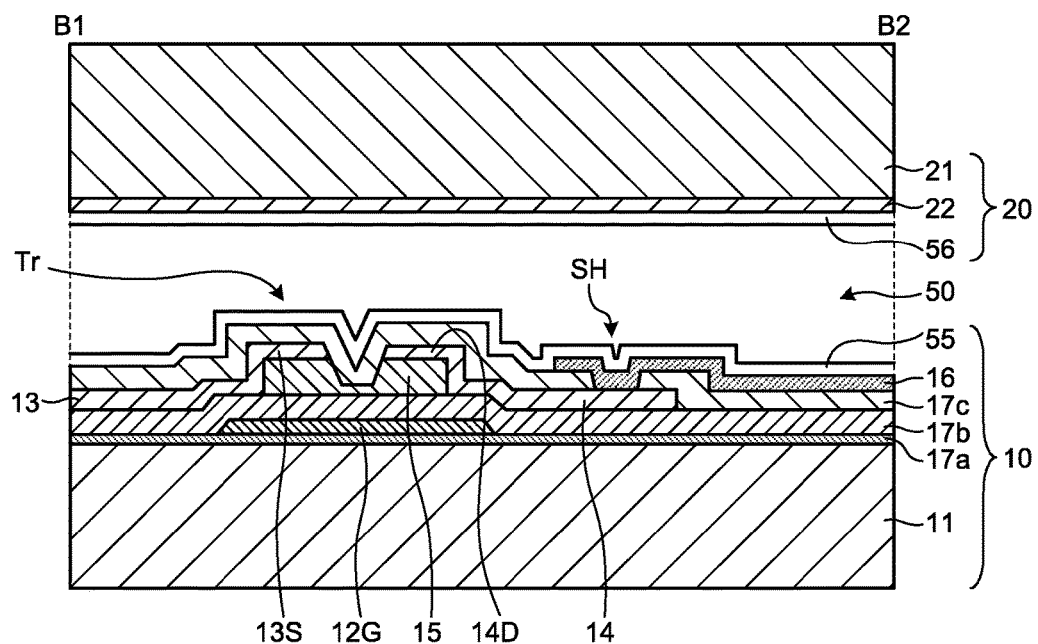
FIG. 11 is a sectional view along XI-XI' in FIG. 10.

FIG. 10 is a plan view illustrating the pixel. FIG. 11 is a sectional view along XI-XI' in FIG. 10. As illustrated in FIGS. 1, 2, and 10, the first translucent substrate 10 is provided with the signal lines 13 and the scanning lines 12 so as to form a grid in the plan view. A region surrounded by the adjacent scanning lines 12 and the adjacent signal lines 13 corresponds to the pixel Pix. The pixel Pix is provided with the pixel electrode 16 and the switching element Tr. In the present embodiment, the switching element Tr is a bottom-gate thin film transistor. The switching element Tr includes a semiconductor layer 15 overlapping, in the plan view, with a gate electrode 12G electrically coupled to corresponding one of the scanning lines 12.

The scanning lines 12 are wiring of a metal such as molybdenum (Mo) and aluminum (Al), a laminated body of these metals, or an alloy thereof. The signal lines 13 are wiring of a metal, such as aluminum, or an alloy thereof.

The semiconductor layer 15 is provided not to protrude from the gate electrode 12G in the plan view. As a result, the light-source light L traveling from the gate electrode 12G toward the semiconductor layer 15 is reflected, and thereby suppressing light leakage in the semiconductor layer 15

As illustrated in FIG. 10, a source electrode 13S electrically coupled to corresponding one of the signal lines 13 overlaps with one end portion of the semiconductor layer 15 in the plan view.

As illustrated in FIG. 10, a drain electrode 14D is arranged in juxtaposition with the source electrode 13S across a central portion of the semiconductor layer 15 in the plan view. The drain electrode 14D overlaps with the other end portion of the semiconductor layer 15 in the plan view. A portion overlapping with neither the source electrode 13S nor the drain electrode 14D serves as a channel of the switching element Tr. As illustrated in FIG. 11, conductive wiring 14 coupled to the drain electrode 14D is electrically coupled to the pixel electrode 16 at a through-hole SH.

As illustrated in FIG. 11, the first translucent substrate 10 includes a first base material 11 made of, for example, glass. The first base material 11 may be made of a resin, such as polyethylene terephthalate, as long as having translucency. A first insulating layer 17a is provided on the first base material 11, and the scanning line 12 and the gate electrode 12G are provided on the first insulating layer 17a. A second insulating layer 17b covers the scanning line 12. The first insulating layer 17a and the second insulating layer 17b are made of, for example, a transparent inorganic insulating member, such as a silicon nitride member.

The semiconductor layer 15 is stacked on the second insulating layer 17b. The semiconductor layer 15 is made of, for example, amorphous silicon, but may be made of polysilicon or an oxide semiconductor.

The source electrode 13S and the signal line 13 partially covering the semiconductor layer 15, the drain electrode 14D partially covering the semiconductor layer 15, and the conductive wiring 14 are provided on the second insulating layer 17b. The drain electrode 14D is made of the same material as that of the signal line 13. A third insulating layer 17c is provided on the semiconductor layer 15, the signal lines 13, and the drain electrode 14D. The third insulating layer 17c is made of, for example, a transparent inorganic insulating member, such as a silicon nitride member.

The pixel electrode 16 is provided on the third insulating layer 17c. The pixel electrode 16 is made of a translucent conductive member, such as an indium tin oxide (ITO) member. The pixel electrode 16 is electrically coupled to the conductive wiring 14 and the drain electrode 14D through contact holes in the third insulating layer 17c. The first orientation film 55 is provided on the pixel electrode 16.

The second translucent substrate 20 includes a second base material 21 made of, for example, glass. The second base material 21 may be made of a resin, such as polyethylene terephthalate, as long as having a translucency. The second base material 21 is provided with the common electrode 22. The common electrode 22 is made of a translucent conductive member, such as an ITO member. The second orientation film 56 is provided on a surface of the common electrode 22.

Figure 12:
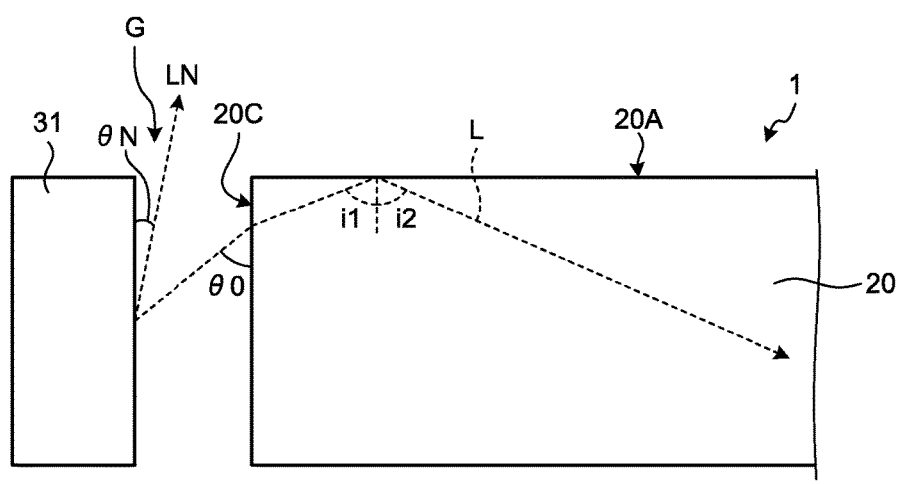
FIG. 12 is a diagram for explaining incident light from a light emitter.

FIG. 12 is a diagram for explaining the incident light from the light emitter. The light from the light emitter 31 is incident on the first side surface 20C of the second translucent substrate 20 at an angle θ0, and then is incident on the first principal surface 20A of the second translucent substrate 20 at an angle i1. If the angle i1 is larger than the critical angle, the light-source light L is fully reflected at an angle i2 by the first principal surface 20A of the second translucent substrate 20, and propagates in the second translucent substrate 20. Since the gap G is provided between the light emitter 31 and the first side surface 20C (light incident surface) as illustrated in FIG. 12, light-source light LN at an angle θN that reduces the angle i1 to below the critical angle is not guided to the first side surface 20C of the second translucent substrate 20.

Figure 13:
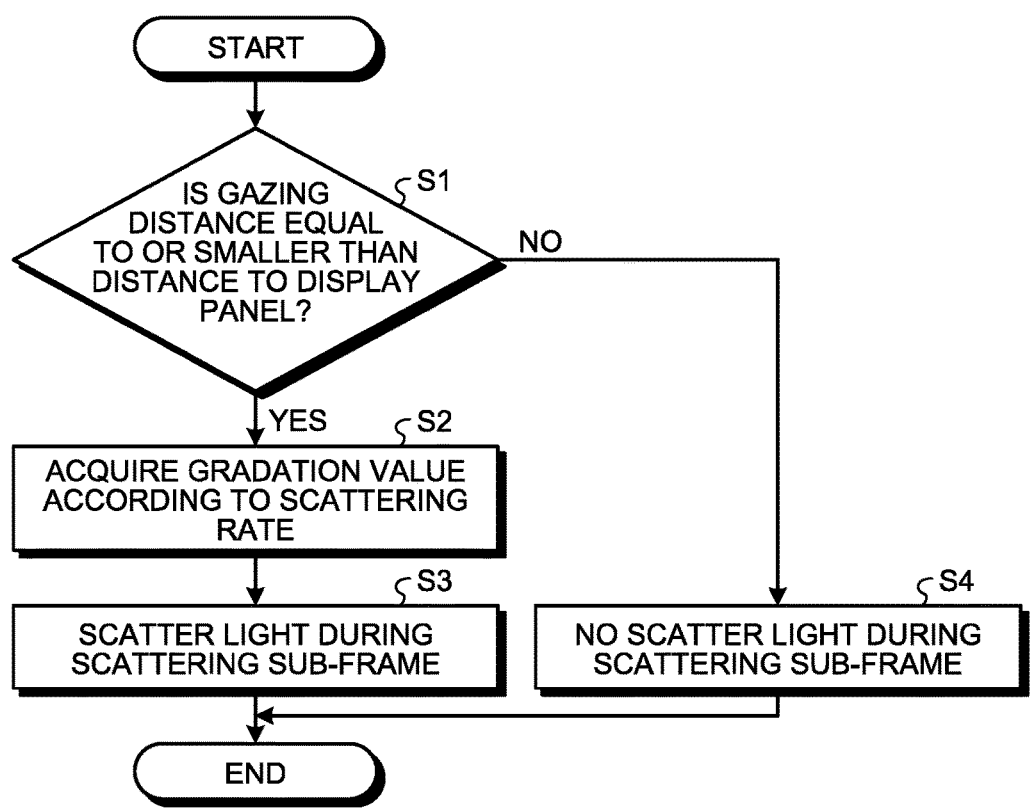
FIG. 13 is a flowchart for explaining a display control method of the embodiment.
Figure 14:
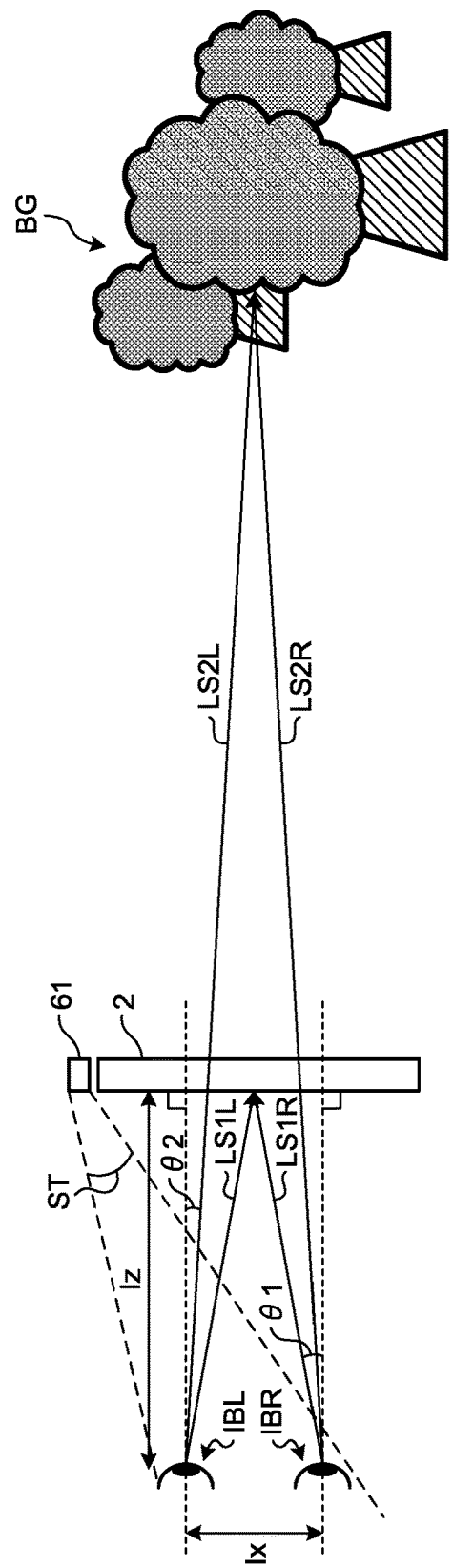
FIG. 14 is a diagram for explaining an interrelation among a viewer, a display panel, and a background.

FIG. 13 is a flowchart for explaining a display control method of the present embodiment. FIG. 14 is a diagram for explaining an interrelation among the viewer, the display panel, and the background. As illustrated in FIG. 14, when the viewer views a background BG through the display panel 2 with eyes at eye positions IBL and IBR, lines of sight LS2L and LS2R are formed. As illustrated in FIG. 14, when the viewer views the image displayed on the display panel 2 with the eyes at the eye positions IBL and IBR, lines of sight LS1L and LS1R are formed.

One of the imaging devices 61 illustrated in FIGS. 1 and 14 captures an image of the viewer at the eye positions IBL and IBR in a range of a field angle ST. The distance between the eye position IBL and the eye position IBR is a pupillary distance Ix. In the present embodiment, when an angle θ denotes an angle of convergence formed by a normal line of the display panel 2 and a line of sight, a gazing distance Iz can be calculated by Expression (1) below.

$$Iz = Ix/(2 \times \tan \theta) \quad (1)$$

In this manner, the display controller 5 calculates the gazing distance Iz based on the convergence angle θ. As illustrated in FIG. 14, if the gazing distance Iz is equal to or smaller than the distance from the eye positions IBL and IBR to the display panel 2 (Yes at Step S1), the eyes of the viewer viewing along the lines of sight more easily come into focus on the display panel 2 than on the background BG. Accordingly, the display controller 5 acquires the gradation value corresponding to the scattering rate stored in advance in the storage 413 (Step S2). The display controller 5 scatters the external light during the scattering sub-frame SON (Step S3) to reduce the transmittance of a processing region BS.

If the gazing distance Iz is not equal to or smaller than the distance from the eye positions IBL and IBR to the display panel 2 (No at Step S1), the eyes of the viewer viewing along the lines of sight more easily come into focus on the background BG than on the display panel 2. Accordingly, the display controller 5 performs control such that the scattering does not occur during the scattering sub-frame SON (Step S4).

Figure 15:
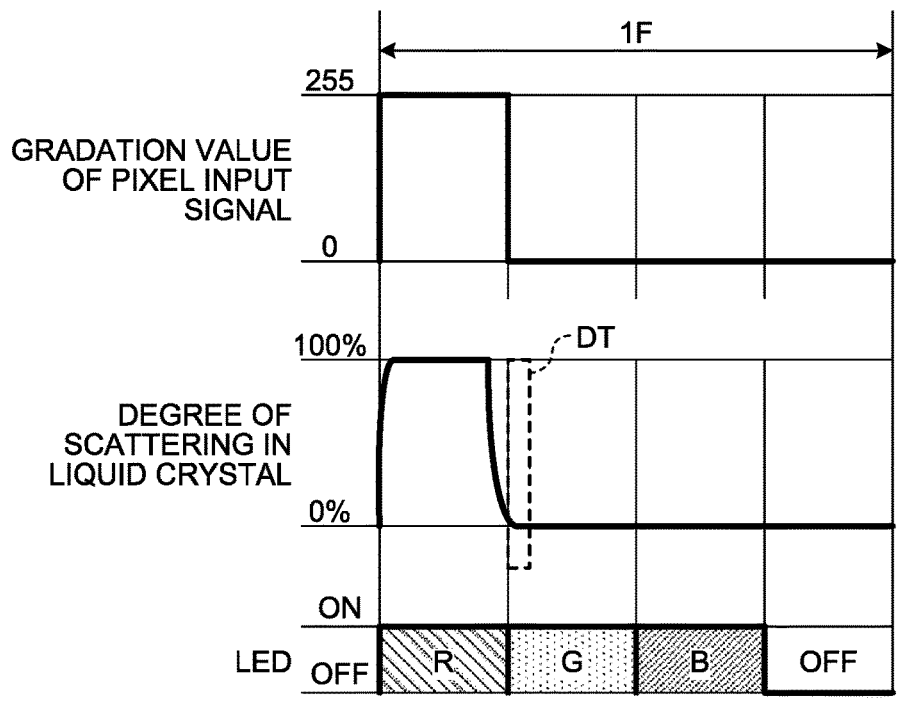
FIG. 15 is a diagram for explaining a gradation value of a pixel input signal to a pixel in a region in which an image is displayed in synchronization with emission of light of a first color, light of a second color, or light of a third color.
Figure 16:
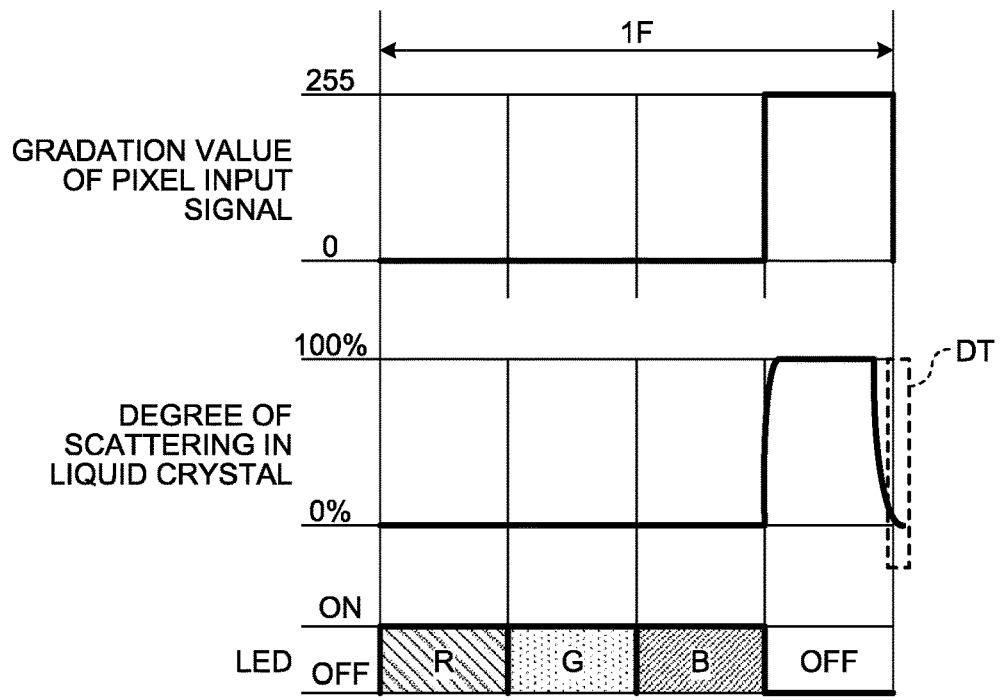
FIG. 16 is a diagram for explaining the gradation value of the pixel input signal in a processing region surrounding the image in which transmittance is controlled.
Figure 17:
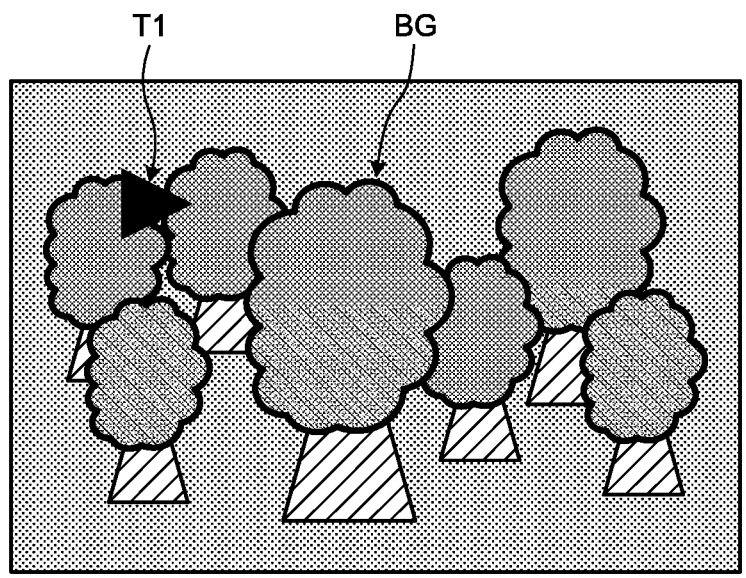
FIG. 17 is a diagram for explaining an example in which external light is not scattered in the processing region surrounding the image.
Figure 18:
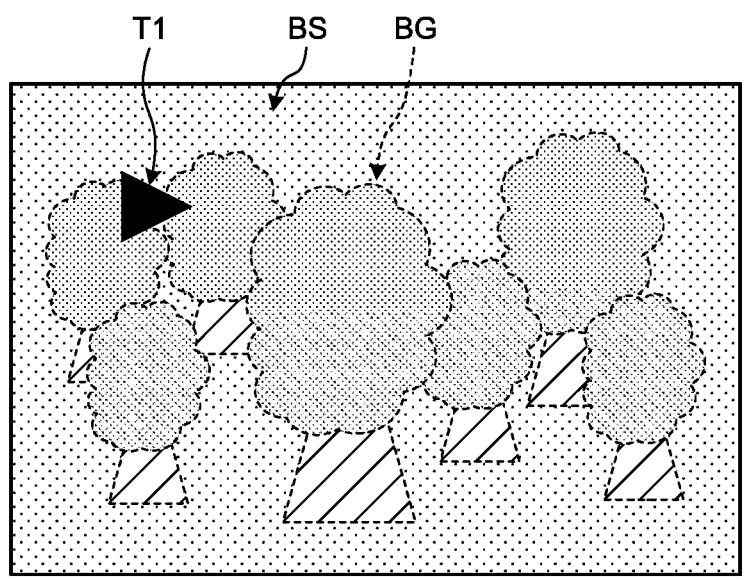
FIG. 18 is a diagram for explaining an example in which the external light is scattered to control the transmittance in the processing region surrounding the image.
Figure 19:
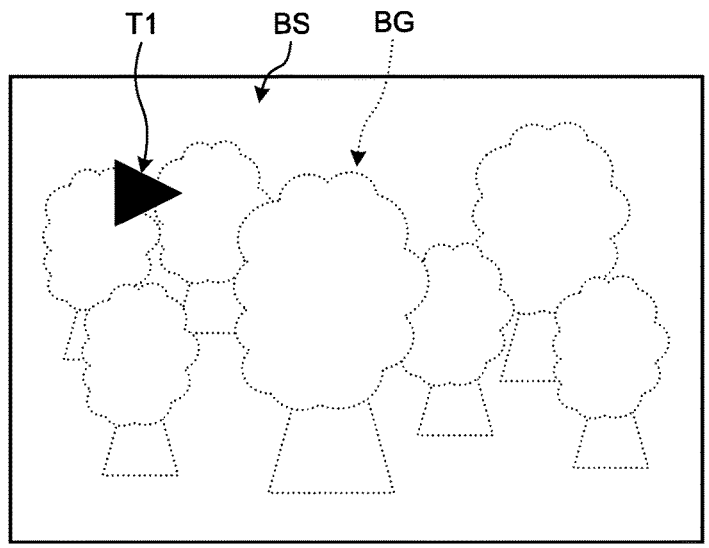
FIG. 19 is a diagram for explaining another example in which the external light is scattered to control the transmittance in the processing region surrounding the image.

FIG. 15 is a diagram for explaining the gradation value of the pixel input signal of the pixel in the region in which the image is displayed in synchronization with the emission of the light of the first color, the light of the second color, or the light of the third color. FIG. 16 is a diagram for explaining the gradation value of the pixel input signal in the processing region surrounding the image in which transmittance is controlled. FIG. 17 is a diagram for explaining an example in which the external light is not scattered in the processing region surrounding the image. FIGS. 18 and 19 are diagrams for explaining examples in which the external light is scattered to control the transmittance in the processing region surrounding the image. The following describes the display control method of a first example, with reference to FIGS. 1, 2, and 13 to 19, where appropriate.

First Example

The convergence angle calculator 93 calculates the pupillary distance Ix from the image of the viewer at the eye positions IBL and IBR captured by the imaging device 61 illustrated in FIG. 2. The convergence angle calculator 93 substitutes a convergence angle θ2 for the convergence angle θ in Expression (1) given above to obtain the gazing distance Iz, as illustrated in FIG. 14. Since the gazing distance Iz is equal to or smaller than the distance from the eye positions IBL and IBR to the display panel 2 (Yes at Step S1), the scattering sub-frame generator 412 acquires the gradation value according to the scattering rate stored in advance in the storage 413 (Step S2).

Specifically, the scattering sub-frame generator 412 partitions the processing region BS corresponding to a region surrounding an image T1 illustrated in FIG. 18, and calculates the gradation value according to the scattering rate in the partitioned processing range BS. The signal adjuster 414 outputs, according to the adjustment signal LAS, the gradation value illustrated in FIG. 15 to pixels in the region of the image T1, and the gradation value illustrated in FIG. 16 to pixels in the processing region BS. As a result, the image T1 is displayed in the first color (e.g., red), and the entire display region surrounding the image T1 serves as the processing region BS, as illustrated in FIG. 18. Thus, the image T1 is easily visible.

As illustrated in FIG. 19, depending on the gradation value illustrated in FIG. 16 generated by the scattering sub-frame generator 412, the background BG can be made totally invisible compared to the background BG illustrated in FIG. 18. In this case, the viewer can view the image T1 with reduced influence of the background BG.

To allow the viewer to view the image T1 while viewing the background BG, the storage 413 stores scattering rates for setting the transmittance surrounding the image T1 to transmittance in a predetermined range. Too low transmittance makes it difficult to contrast the image T1 with the processing region BS. Too high transmittance can unintentionally reduce the visibility of the background BG due to the influence of intensity of the external light, as illustrated in FIG. 19.

The convergence angle calculator 93 substitutes a convergence angle θ1 for the convergence angle θ in Expression (1) given above to obtain the gazing distance Iz, as illustrated in FIG. 14. If the gazing distance Iz is not equal to or smaller than the distance from the eye positions IBL and IBR to the display panel 2 (No at Step S1), the eyes of the viewer viewing along the lines of sight more easily come into focus on the background BG than on the display panel 2. Accordingly, the display controller 5 performs control such that the scattering does not occur during the scattering sub-frame SON (Step S4). As a result, the image T1 is displayed in the first color (e.g., red), and the background BG surrounding the image T1 is easily visible, as illustrated in FIG. 17.

As described above, the display controller 5 controls the degree of scattering in at least the region surrounding the displayed image according to the gazing distance Iz.

In this manner, the background BG surrounding the image T1 is easily visible when the gazing distance Iz is a distance from the eye positions IBL and IBR to the background side of the display panel 2. When the gazing distance Iz is a distance from the eye positions IBL and IBR to the display panel 2 or a distance from the eye positions IBL and IBR to the viewer side of the display panel 2, the transmittance of the processing region BS surrounding the image T1 is reduced, and the visibility of the image T1 is improved. When the image T1 has a similar color to that of the background BG, the influence of the color of the background BG is suppressed, and the image T1 is more easily visible. Although the example has been described in which one image T1 is displayed in the display region, a plurality of images may be displayed therein.

Figure 20:
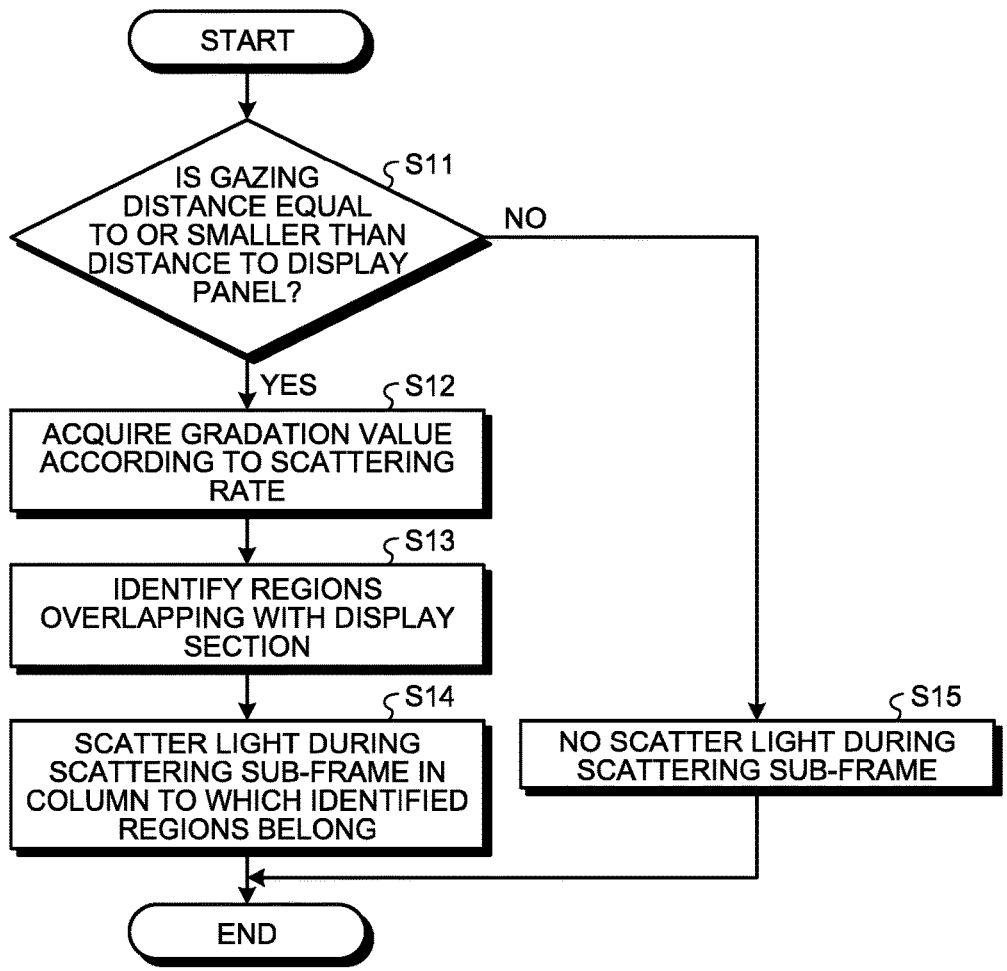
FIG. 20 is a flowchart for explaining another display control method of the embodiment.

FIG. 20 is a flowchart for explaining another display control method of the present embodiment. FIG. 21 is a diagram for explaining still another example in which the external light is scattered to control the transmittance in the processing region surrounding the image. FIG. 22 is a diagram for explaining a plurality of regions obtained by dividing the display region. The following describes the display control method of a second example, with reference to FIGS. 1, 2, 14 to 17, and 20 to 22, where appropriate.

Second Example

In the second example, the processing region BS is not the entire display region, but a part of the display region. The convergence angle calculator 93 calculates the pupillary distance Ix from the image of the viewer at the eye positions IBL and IBR captured by the imaging device 61 illustrated in FIG. 2. The convergence angle calculator 93 substitutes the convergence angle θ2 for the convergence angle θ in Expression (1) given above to obtain the gazing distance Iz, as illustrated in FIG. 14. Since the gazing distance Iz is equal to or smaller than the distance from the eye positions IBL and IBR to the display panel 2 (Yes at Step S11), the scattering sub-frame generator 412 acquires the gradation value according to the scattering rate stored in advance in the storage 413 (Step S12).

Then, the scattering sub-frame generator 412 divides the display region into a plurality of regions A11, A12, A13, A14, A21, A22, A23, A24, A31, A32, A33, A34, A41, A42, A43, A44, A51, A52, A53, and A54, to from a row-column configuration as illustrated in FIG. 22. In the second example, the display section of the image T1 illustrated in FIG. 21 corresponds to the regions A11, A12, A21, and A22 illustrated in FIG. 22. Accordingly, the scattering sub-frame generator 412 identifies the regions A11, A12, A21, and A22 overlapping with the display section of the image T1 (Step S13).

Subsequently, the scattering sub-frame generator 412 generates the adjustment signal LAS assuming the processing region BS to be the regions A11, A12, A21, A22, A13, A23, A14, and A24 in columns to which the regions A11, A12, A21, and A22 overlapping with the display section of the image T1 belong, as illustrated in FIG. 21. In this manner, the display controller 5 performs control such that the external light is scattered during the scattering sub-frame SON in the column(s) of the identified regions (Step S14). For example, according to the adjustment signal LAS, the signal adjuster 414 outputs the gradation value illustrated in FIG. 15 to pixels in the region of the image T1 illustrated in FIG. 21, and outputs the gradation value illustrated in FIG. 16 to pixels in the processing region BS illustrated in FIG. 21. As a result, the image T1 is displayed in the first color (e.g., red), and the columns of the identified regions of the display region surrounding the image T1 serves as the processing region BS, as illustrated in FIG. 21. Thus, the image T1 is easily visible. The background BG is easily visible outside the processing region BS.

If the gazing distance Iz is not equal to or smaller than the distance from the eye positions IBL and IBR to the display panel 2 (No at Step S11), the eyes of the viewer viewing along the lines of sight more easily come into focus on the background BG than on the display panel 2. Accordingly, the display controller 5 performs control such that the scattering does not occur during the scattering sub-frame SON (Step S15). As a result, the image T1 is displayed in the first color (e.g., red), and the background BG surrounding the image T1 is easily visible, as illustrated in FIG. 17.

Figure 23:
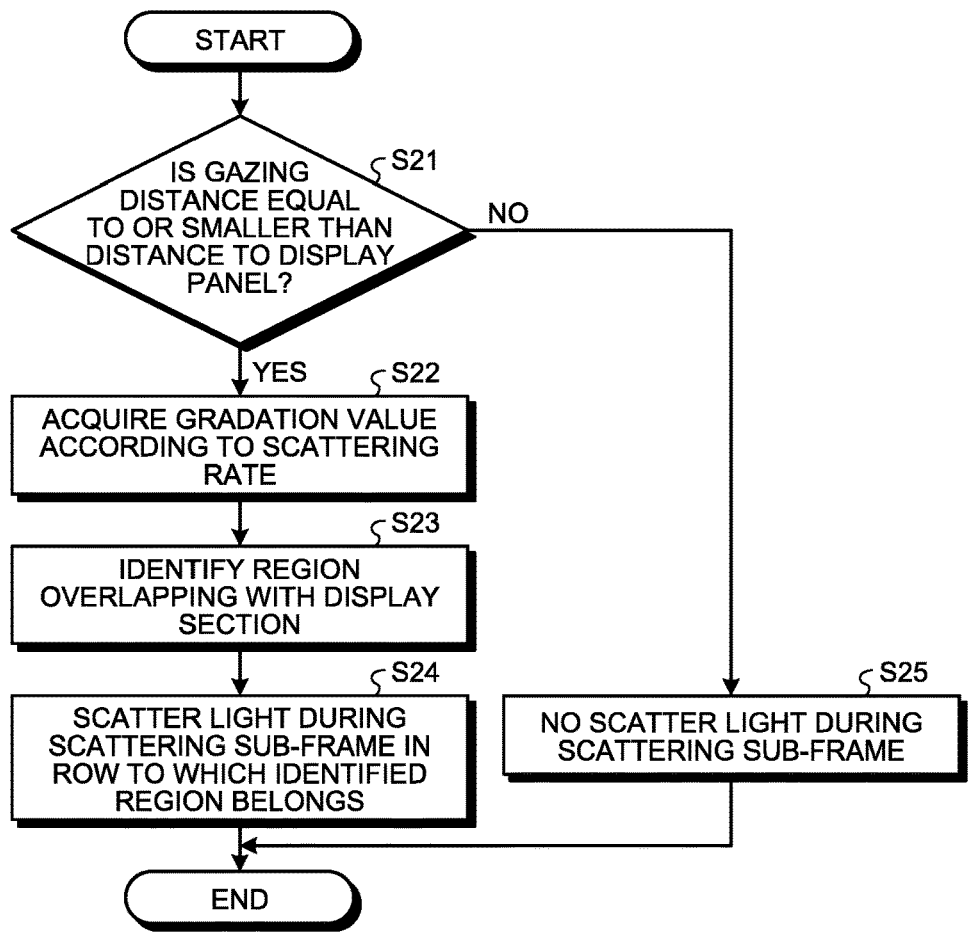
FIG. 23 is a flowchart for explaining still another display control method of the embodiment.
Figure 24:
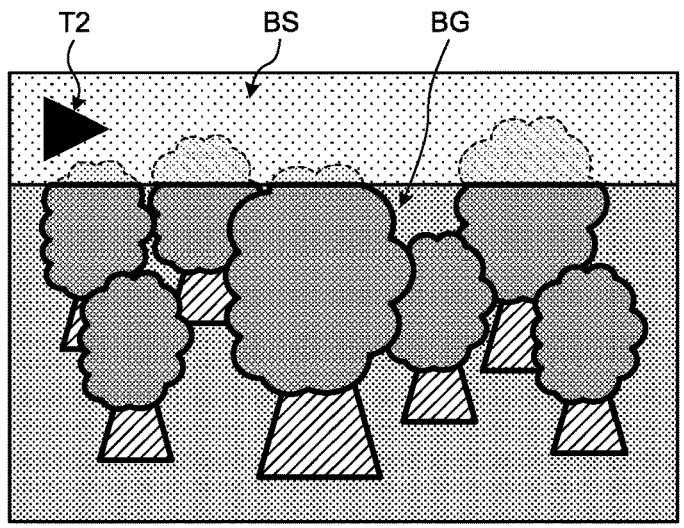
FIG. 24 is a diagram for explaining still another example in which the external light is scattered to control the transmittance in the processing region surrounding the image.

FIG. 23 is a flowchart for explaining still another display control method of the present embodiment. FIG. 24 is a diagram for explaining still another example in which the external light is scattered to control the transmittance in the processing region surrounding an image. The following describes the display control method of a third example, with reference to FIGS. 1, 2, 14 to 17, and 22 to 24, where appropriate.

Third Example

In the third example, the processing region BS is not the entire display region, but a part of the display region. The convergence angle calculator 93 calculates the pupillary distance Ix from the image of the eye positions IBL and IBR of the viewer captured by the imaging device 61 illustrated in FIG. 2. The convergence angle calculator 93 substitutes the convergence angle θ2 for the convergence angle θ in Expression (1) given above to obtain the gazing distance Iz, as illustrated in FIG. 14. Since the gazing distance Iz is equal to or smaller than the distance from the eye positions IBL and IBR to the display panel 2 (Yes at Step S21), the scattering sub-frame generator 412 acquires the gradation value according to the scattering rate stored in advance in the storage 413 (Step S22).

In the third example, the display section of an image T2 illustrated in FIG. 24 corresponds to the region A11 illustrated in FIG. 22. Accordingly, the scattering sub-frame generator 412 identifies the region A11 overlapping with the display section of the image T2 (Step S23).

Subsequently, the scattering sub-frame generator 412 generates the adjustment signal LAS, assuming that the regions A11, A21, A31, A41, and A51 in a row to which the region A11 overlapping with the display section of the image T2 belongs are the processing region BS, as illustrated in FIG. 24. In this manner, the display controller 5 performs control such that the external light is scattered during the scattering sub-frame SON in the row of the identified region (Step S24). For example, according to the adjustment signal LAS, the signal adjuster 414 outputs the gradation value illustrated in FIG. 15 to pixels in the region of the image T2 illustrated in FIG. 24, and outputs the gradation value illustrated in FIG. 16 to pixels in the processing region BS illustrated in FIG. 24. As a result, the image T2 is displayed in the first color (e.g., red), and the row of the identified region of the display region surrounding the image T2 serves as the processing region BS, as illustrated in FIG. 24. Thus, the image T2 is easily visible. The background BG is easily visible outside the processing region BS.

If the gazing distance Iz is not equal to or smaller than the distance from the eye positions IBL and IBR to the display panel 2 (No at Step S21), the eyes of the viewer viewing along the lines of sight more easily come into focus on the background BG than on the display panel 2. Accordingly, the display controller 5 performs control such that the scattering does not occur during the scattering sub-frame SON (Step S25). As a result, the image T2 is displayed in the first color (e.g., red), and the background BG surrounding the image T1 is easily visible, as illustrated in FIG. 17.

Figure 25:
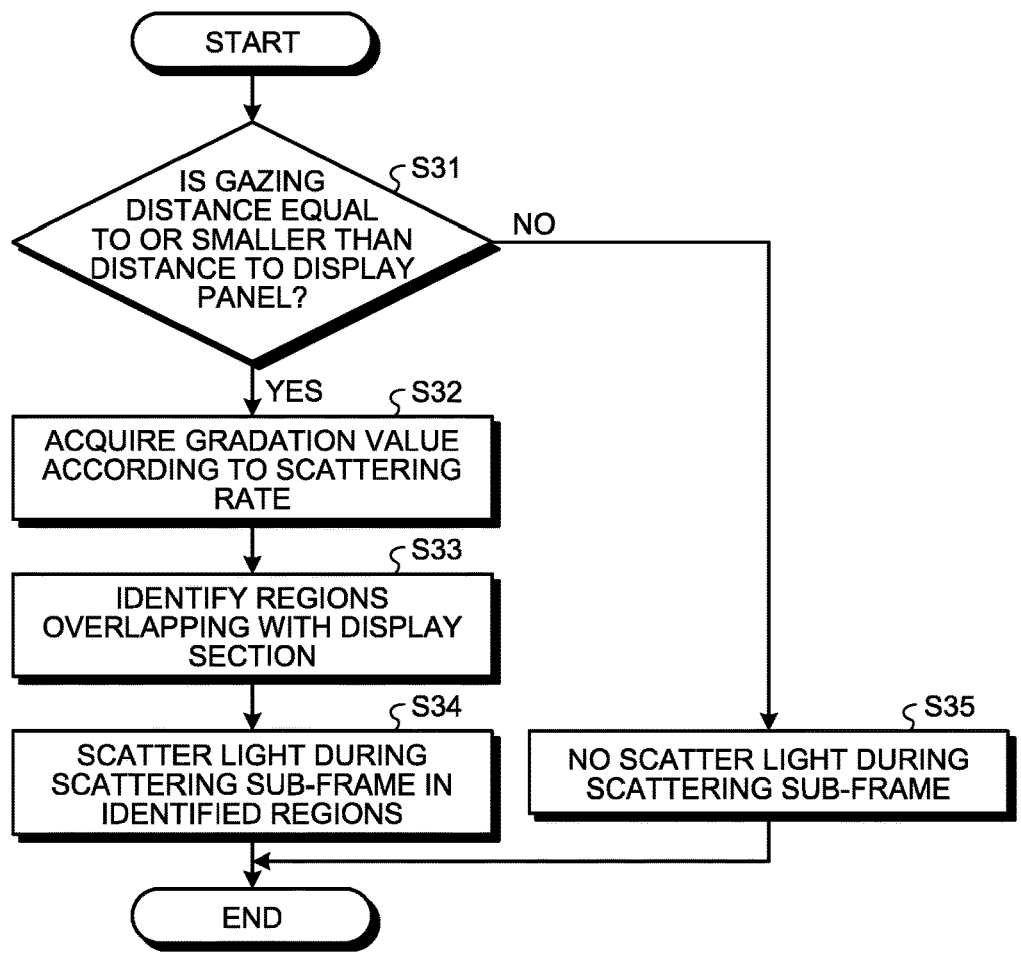
FIG. 25 is a flowchart for explaining still another display control method of the embodiment.
Figure 26:
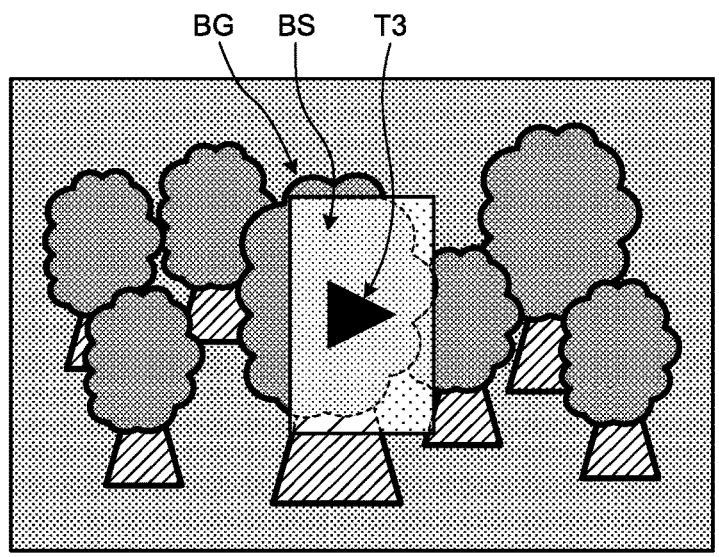
FIG. 26 is a diagram for explaining still another example in which the external light is scattered to control the transmittance in the processing region surrounding the image.

FIG. 25 is a flowchart for explaining still another display control method of the present embodiment. FIG. 26 is a diagram for explaining still another example in which the external light is scattered to control the transmittance in the processing region surrounding an image. The following describes the display control method of a fourth example, with reference to FIGS. 1, 2, 14 to 16, 22, 25, and 26, where appropriate.

Fourth Example

In the fourth example, the processing region BS is not the entire display region, but a part of the display region. The convergence angle calculator 93 calculates the pupillary distance Ix from the image of the viewer at the eye positions IBL and IBR captured by the imaging device 61 illustrated in FIG. 2. The convergence angle calculator 93 substitutes the convergence angle θ2 for the convergence angle θ in Expression (1) given above to obtain the gazing distance Iz, as illustrated in FIG. 14. Since the gazing distance Iz is equal to or smaller than the distance from the eye positions IBL and IBR to the display panel 2 (Yes at Step S31), the scattering sub-frame generator 412 acquires the gradation value according to the scattering rate stored in advance in the storage 413 (Step S32).

In the fourth example, the display section of an image T3 illustrated in FIG. 26 corresponds to the regions A32 and A33 illustrated in FIG. 22. Accordingly, the scattering sub-frame generator 412 identifies the regions A32 and A33 overlapping with the display section of the image T3 (Step S33).

Subsequently, the scattering sub-frame generator 412 generates the adjustment signal LAS, assuming that the regions A32 and A33 in a column to which the regions overlapping with the display section of the image T3 belong are the processing region BS, as illustrated in FIG. 26. In this manner, the display controller 5 performs control such that the external light is scattered during the scattering sub-frame SON in the identified regions overlapping with the display section of the image T3 (Step S34). For example, according to the adjustment signal LAS, the signal adjuster 414 outputs the gradation value illustrated in FIG. 15 to pixels in the region of the image T3 illustrated in FIG. 26, and outputs the gradation value illustrated in FIG. 16 to pixels in the processing region BS illustrated in FIG. 26. As a result, the image T3 is displayed in the first color (e.g., red), and the region surrounding the image T3 serves as the processing region BS, as illustrated in FIG. 26. Thus, the image T3 is easily visible. The background BG is easily visible outside the processing region BS.

If the gazing distance Iz is not equal to or smaller than the distance from the eye positions IBL and IBR to the display panel 2 (No at Step S31), the eyes of the viewer viewing along the lines of sight more easily come into focus on the background BG than on the display panel 2. Accordingly, the display controller 5 performs control such that the scattering does not occur during the scattering sub-frame SON (Step S35). As a result, the image T3 is displayed in the first color (e.g., red), and the background BG surrounding the image T3 is easily visible, as illustrated in FIG. 17.

Fifth Example

Figure 27:
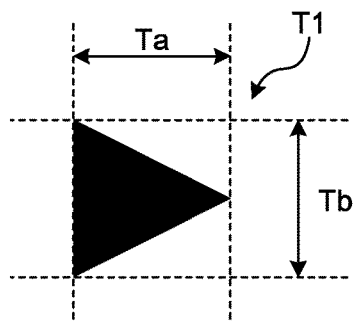
FIG. 27 is a diagram for explaining a region overlapping with a display section of the image.

FIG. 27 is a diagram for explaining a region overlapping with the display section of an image. An image in a fifth example can be applied to any one of the images T1, T2, and T3 described above, but the following description is given by exemplifying the image T1. As illustrated in FIG. 27, the image T1 has a maximum first direction length Ta and a maximum second direction length Tb.

Figure 28:
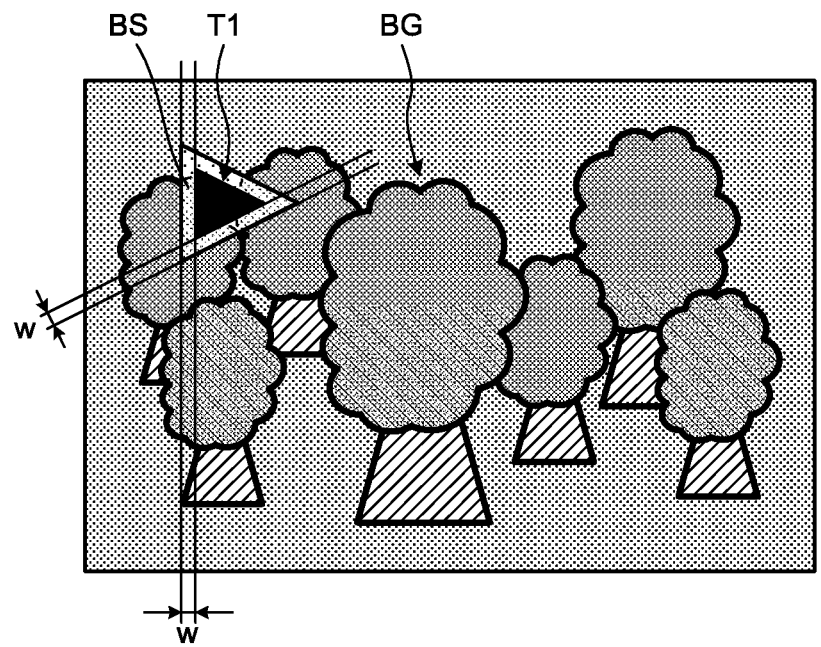
FIG. 28 is an explanatory diagram illustrating an example of the processing region surrounding the image.

FIG. 28 is an explanatory diagram illustrating an example of the processing region surrounding the image. When the processing region BS is set to be a range surrounding the image T1 and having a width w from the outline of the image T1, as illustrated in FIG. 28, the outline of the image T1 can be highlighted by the processing region BS. In the example illustrated in FIG. 28, the width w is constant.

Figure 29:
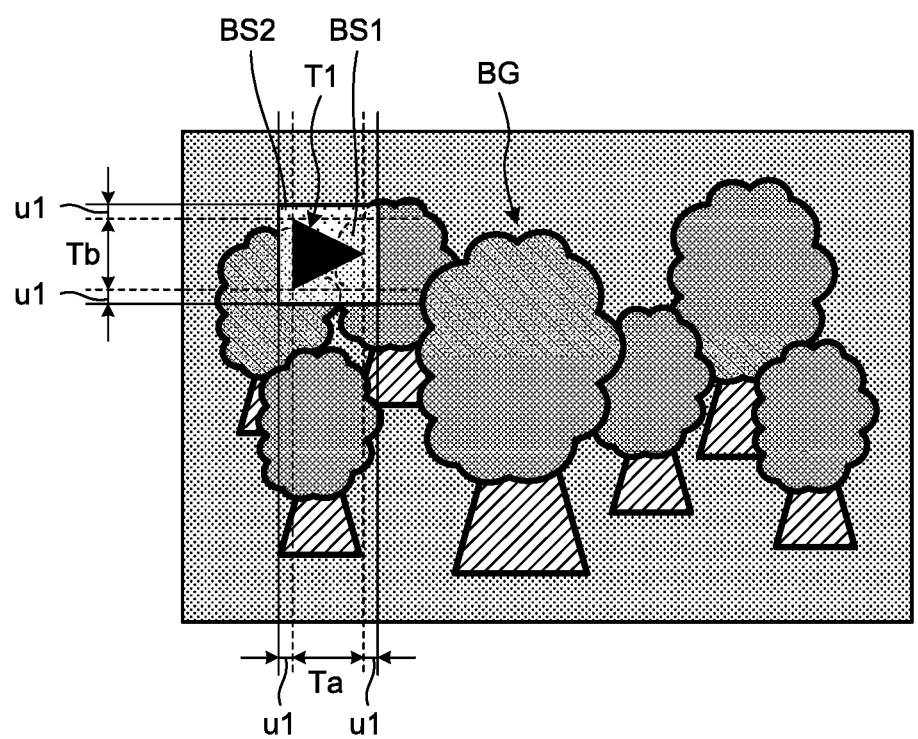
FIG. 29 is an explanatory diagram illustrating an example of processing regions surrounding the image.

FIG. 29 is an explanatory diagram illustrating an example of processing regions surrounding the image. As illustrated in FIG. 29, the image T1 has the maximum first direction length Ta and the maximum second direction length Tb. As illustrated in FIG. 29, a processing region BS1 is a range surrounding the image T1 and surrounded by the maximum first direction length Ta and the maximum second direction length Tb. A processing region BS2 is a range having a width u1 from the outline of the processing region BS1. The processing regions BS1 and BS2 can fill the surrounding region of the image T1 without a void even if the image T1 has a complicated shape. As a result, the image T1 is highlighted by the processing regions BS1 and BS2. In other words, in the example illustrated in FIG. 29, the processing region BS1 covers a range surrounding the image T1 without having a constant width.

Figure 30:
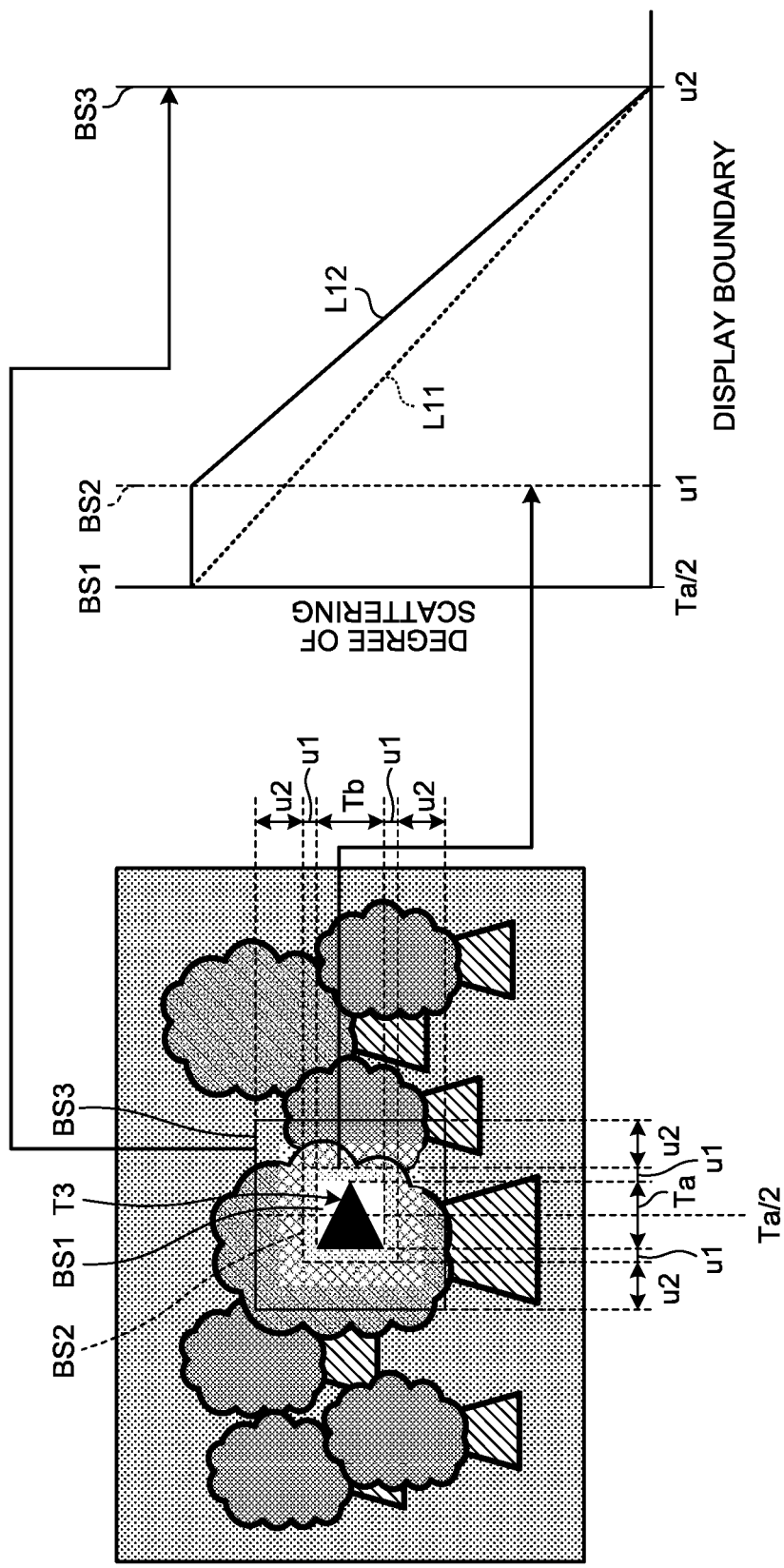
FIG. 30 is an explanatory diagram illustrating another example of processing regions surrounding the image.

The following describes an example in which the image T3 is displayed by the processing regions BS1 and BS2. FIG. 30 is an explanatory diagram illustrating another example of processing regions surrounding the image. As illustrated in FIG. 30, the image T3 has the maximum first direction length Ta and the maximum second direction length Tb. As illustrated in FIG. 30, the processing region BS1 is a range surrounding the image T3 and surrounded by the maximum first direction length Ta and the maximum second direction length Tb. The processing region BS2 is the range having the width u1 from the outline of the processing region BS1. A processing region BS3 is a range having a width u2 from the outline of the processing region BS2.

At Step S34, the display controller 5 sets the gradation value such that the degree of scattering of the external light is constant in the processing regions BS1 and BS2, and thus scatters the external light during the scattering sub-frame SON. The display controller 5 gradually lowers the degree of scattering in the processing region BS3 along a straight line L12 as the processing region BS3 becomes farther from the image T3. As a result, the processing region BS3 decreases in degree of scattering of the external light and gradually becomes transparent as being farther from the image T3. Accordingly, the transmittance in the processing region BS3 increases and the background BG becomes more easily visible as the processing region BS3 becomes farther from the image T3. The boundary between the processing region BS3 and the background BG becomes less visible, suppressing an feeling of strangeness caused by the processing region BS3.

Alternatively, at Step S34, the display controller 5 may gradually lower the degree of scattering of the external light in the processing regions BS2 and BS3 along a straight line L11 as the processing regions BS2 and BS3 become farther from the image T3. As a result, the processing region BS2 decreases in degree of scattering of the external light and gradually becomes transparent as being farther from the image T3. Accordingly, the transmittance in the processing region BS2 increases and the background BG becomes more easily visible as the processing region BS2 becomes farther from the image T3. In the same manner, the transmittance in the processing region BS3 also increases and the background BG becomes more easily visible as the processing region BS3 becomes farther from the image T3. Accordingly, the boundary between the processing region BS3 and the background BG becomes less visible, suppressing the feeling of strangeness caused by the processing region BS3.

Figure 31:
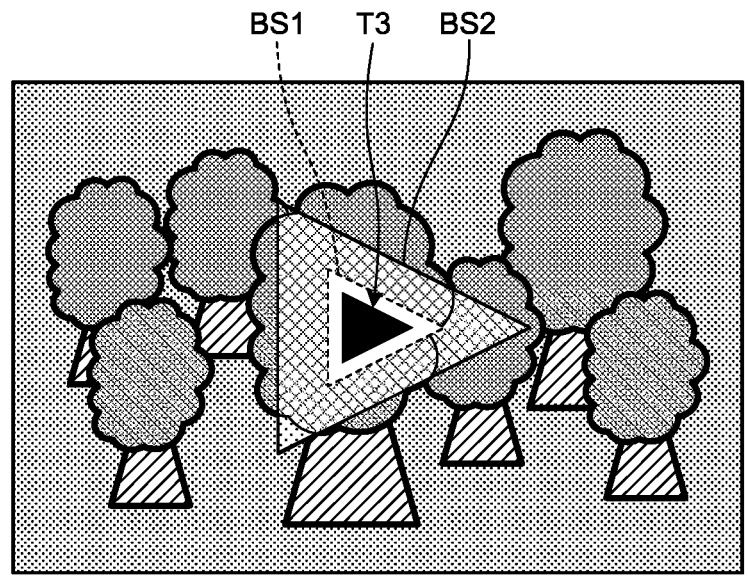
FIG. 31 is an explanatory diagram illustrating still another example of processing regions surrounding the image.

FIG. 31 is an explanatory diagram illustrating still another example of processing regions surrounding the image. As illustrated in FIG. 31, the processing region BS1 may be a range surrounding the image T3 and having a predetermined width from the outline of the image T3, and the processing region BS2 may be a range surrounding the processing region BS1 and having a predetermined width from the outline of the processing region BS1.

Figure 32:
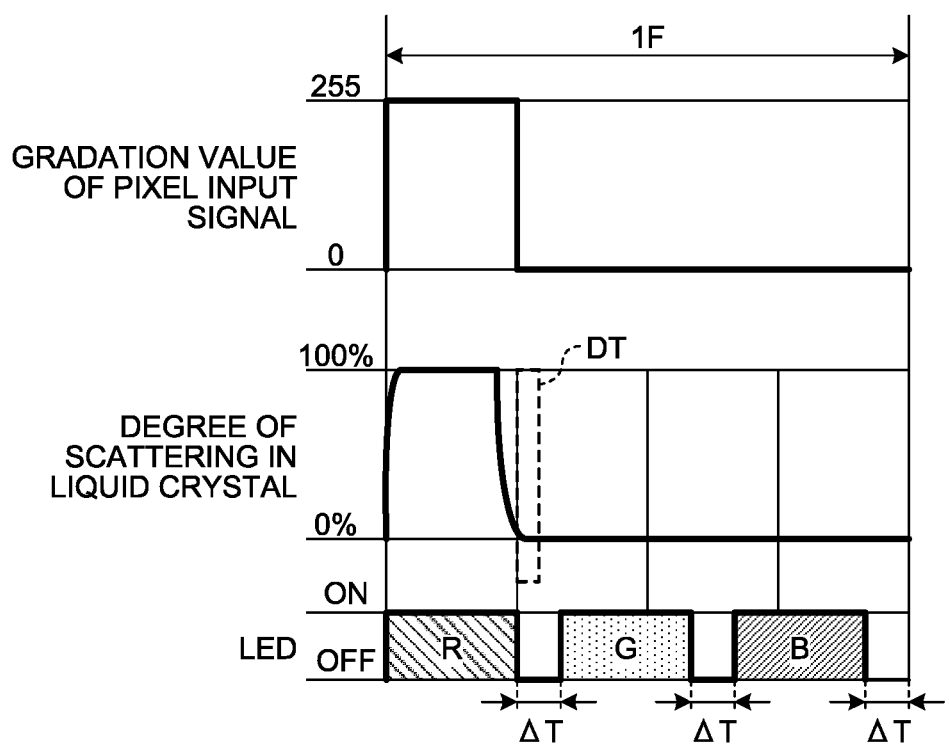
FIG. 32 is another diagram for explaining the gradation value of the pixel input signal of the pixel in the region in which the image is displayed in synchronization with the emission of the light of the first color, the light of the second color, or the light of the third color.
Figure 33:
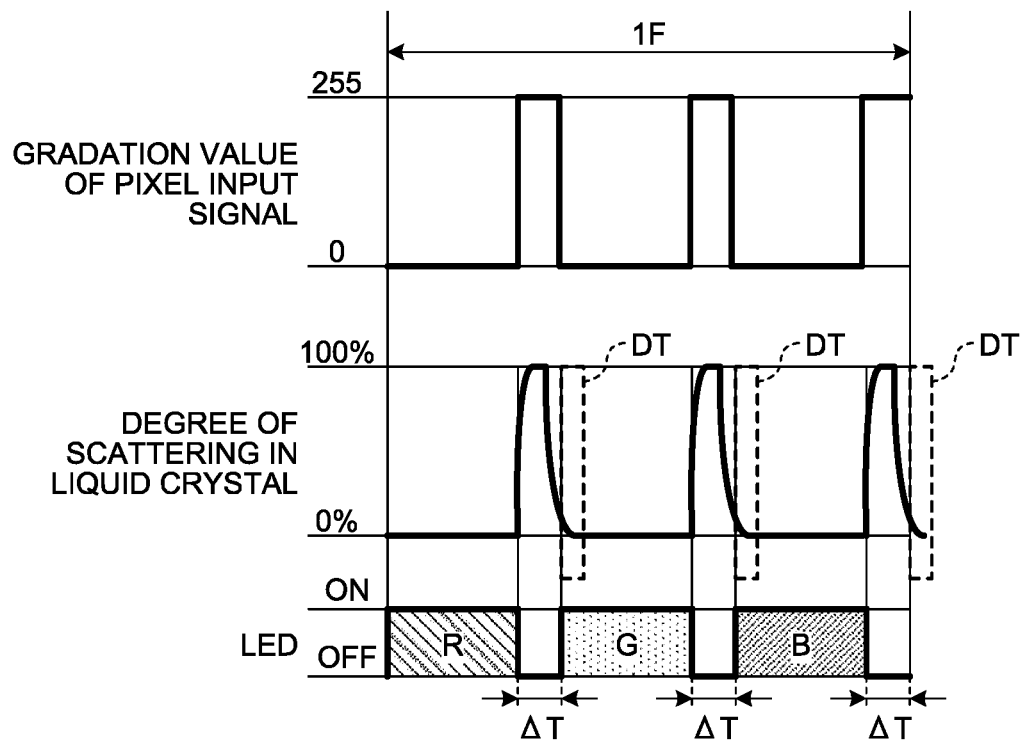
FIG. 33 is another diagram for explaining the gradation value of the pixel input signal in the processing region surrounding the image in which the transmittance is controlled.

FIG. 32 is another diagram for explaining the gradation value of the pixel input signal of the pixel in the region in which the image is displayed in synchronization with the emission of the light of the first color, the light of the second color, or the light of the third color. FIG. 33 is another diagram for explaining the gradation value of the pixel input signal in the processing region surrounding the image in which the transmittance is controlled.

The light emitter 34R of the first color, the light emitter 34G of the second color, and the light emitter 34B of the third color, which are illustrated in FIG. 2, are driven by the field-sequential system. For example, in FIG. 15, the behavior of the transmittance of the liquid crystal is delayed in response to the behavior of the pixel input signal in a period DT. In the same manner, in FIG. 16, the behavior of the transmittance of the liquid crystal is delayed in response to the behavior of the pixel input signal in the period DT. If the period DT illustrated in FIG. 16 overlaps with the next frame, an unintended image may be displayed.

Thus, as illustrated in FIGS. 32 and 33, a scattering sub-frame period $\Delta T$ is provided between the first sub-frame RON and the second sub-frame GON, between the second sub-frame GON and the third sub-frame BON, and between the third sub-frame BON and the first sub-frame RON. The scattering sub-frame period $\Delta T$ is set longer than the period DT. This setting improves color reproduction of each of the first color, the second color, and the third color, and reduces a color breakup.

Figure 34:
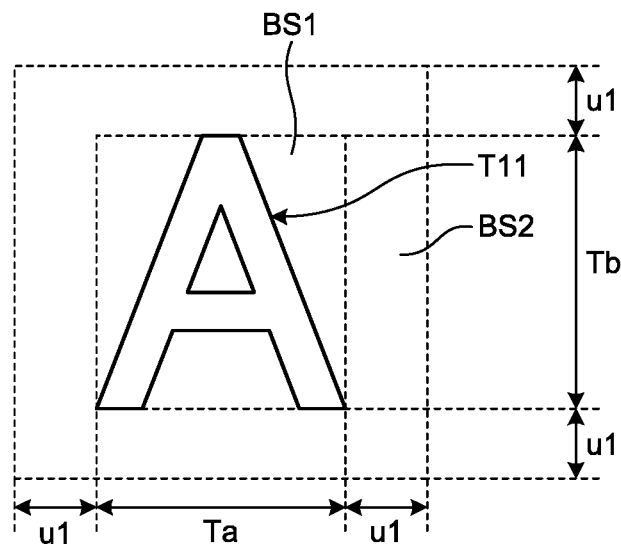
FIG. 34 is a diagram for explaining an exemplary image of the embodiment.

FIG. 34 is a diagram for explaining an exemplary image of the present embodiment. For example, each of the images described above is not limited to certain display contents, such as characters, symbols, lines, and drawing patterns. As illustrated in FIG. 34, an image T11 has the maximum first direction length Ta and the maximum second direction length Tb. The processing region BS1 is a range surrounding the image T11 and surrounded by the maximum first direction length Ta and the maximum second direction length Tb. The processing region BS2 is the range having the width u1 from the outline of the processing region BS1.

First Modification

Figure 35:
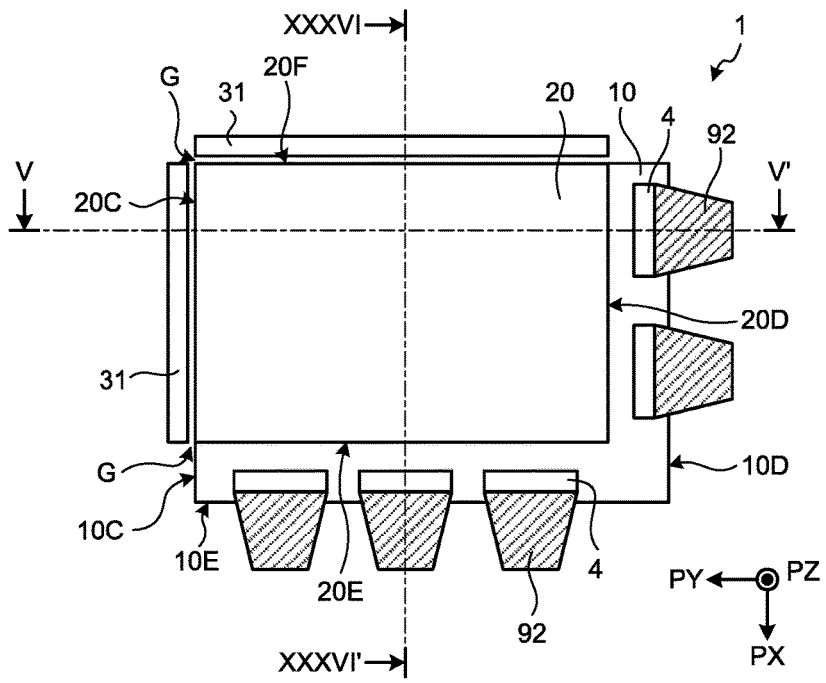
FIG. 35 is a plan view illustrating a plane of a display device according to a first modification of the embodiment.
Figure 36:
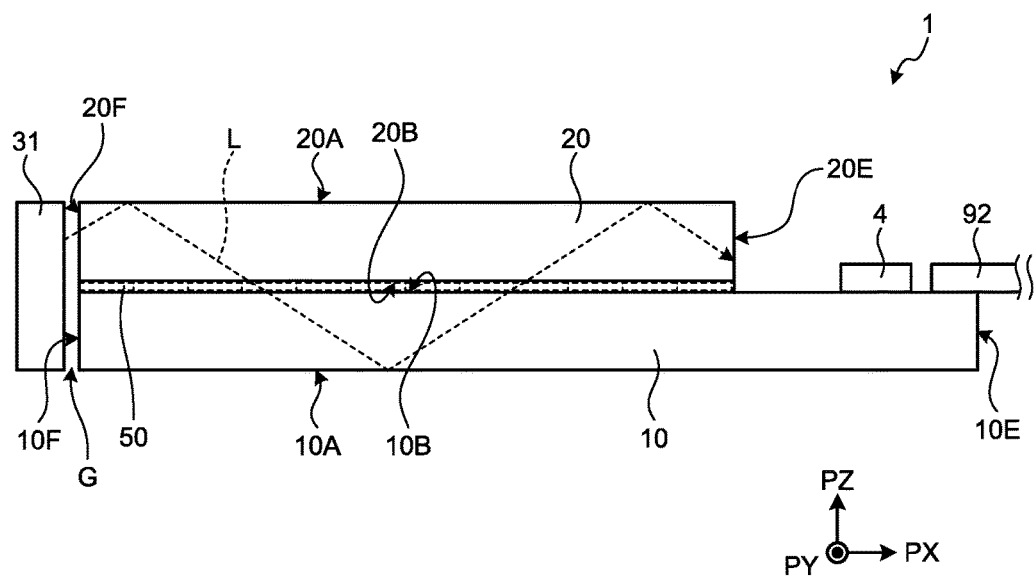
FIG. 36 is a sectional view along XXXVI-XXXVI' in FIG. 35.

FIG. 35 is a plan view illustrating a plane of a display device according to a first modification of the present embodiment. FIG. 36 is a sectional view along XXXVI-XXXVI' in FIG. 35. The same components as those described above in the present embodiment are denoted by the same reference numerals, and the description thereof will not be repeated. Since the section along V-V' in FIG. 35 is the same as that of the display device of the present embodiment illustrated in FIG. 5, the description thereof will not be repeated.

As illustrated in FIGS. 35 and 36, one of the light emitters 31 faces the fourth side surface 20F of the second translucent substrate 20. As illustrated in FIG. 36, the light emitter 31 emits the light-source light L to the fourth side surface 20F of the second translucent substrate 20. The fourth side surface 20F of the second translucent substrate 20 opposed to the light emitter 31 serves as a light incident surface. The gap G is provided between the light emitter 31 and the light incident surface. The gap G forms an air layer.

As illustrated in FIG. 36, the light-source light L emitted from the light emitter 31 propagates in a direction away from the fourth side surface 20F while being reflected by the first principal surface 10A of the first translucent substrate 10 and the first principal surface 20A of the second translucent substrate 20.

The display device 1 according to the first modification of the present embodiment includes the first translucent substrate 10, the second translucent substrate 20, the liquid crystal layer 50, and the light emitters 31. The two light emitters 31 face the first side surface 20C and the fourth side surface 20F of the second translucent substrate 20. With this configuration, the light quantity of in-plane light emitted from the two light emitters 31 and propagating in the display panel 2 increases. The uniformity of the in-plane light propagating in the display panel 2 also increases. A region P1 and a region P2 illustrated in FIG. 6 differ in distance from the light emitter 31, and therefore differ in in-plane light quantity. In contrast, the display device 1 according to the first modification of the present embodiment causes light to propagate from two intersecting directions, thereby reducing the difference in in-plane light quantity.

Second Modification

Figure 37:
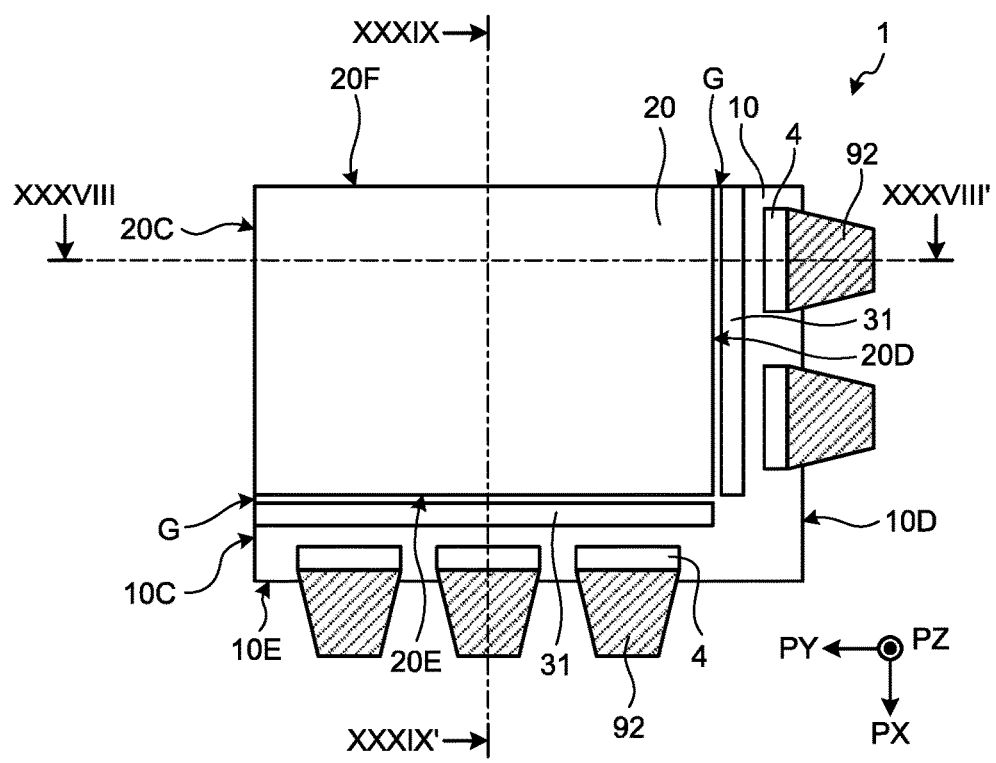
FIG. 37 is a plan view illustrating a plane of a display device according to a second modification of the embodiment.
Figure 38:
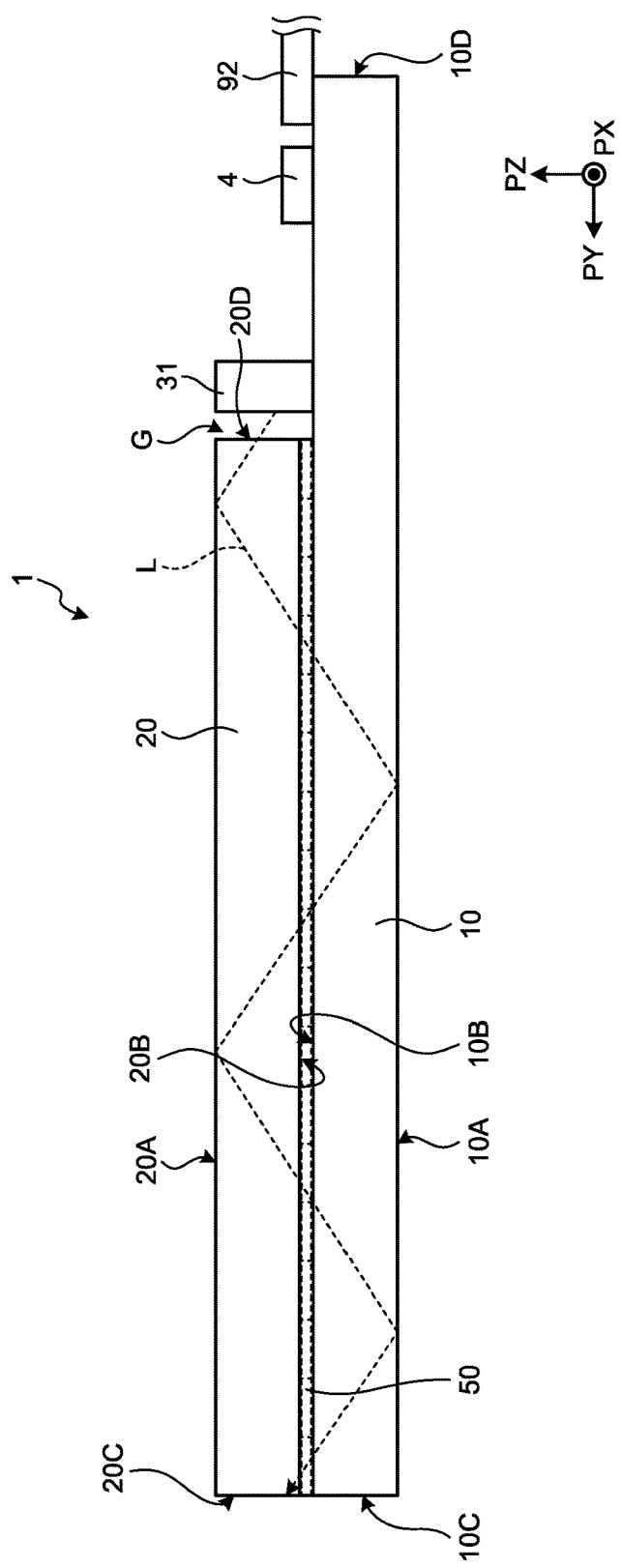
FIG. 38 is a sectional view along XXXVIII-XXXVIII' in FIG. 37.
Figure 39:
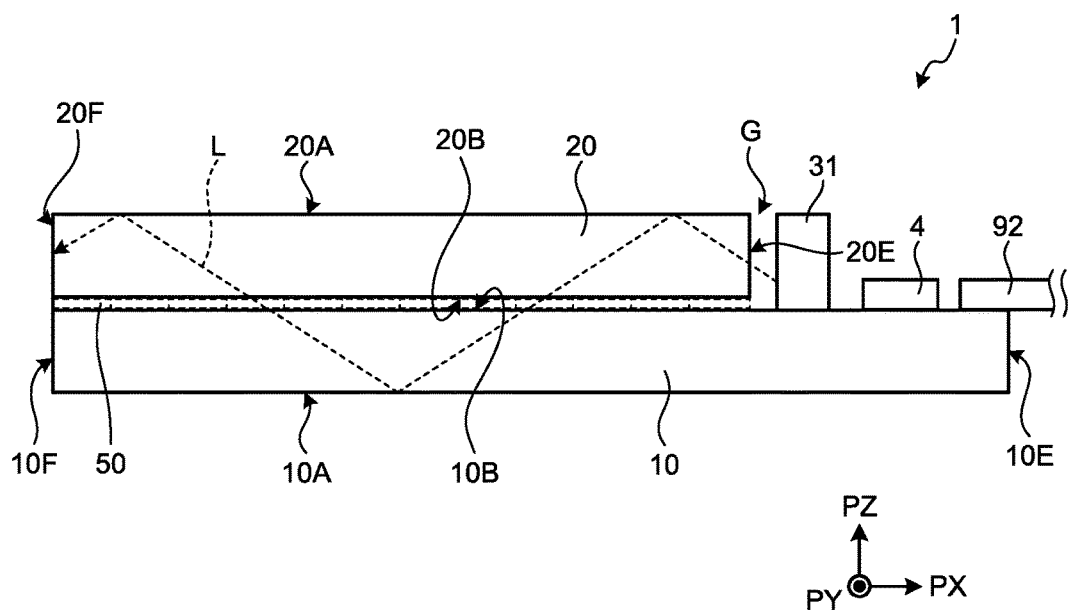
FIG. 39 is a sectional view along XXXIX-XXXIX' in FIG. 37.

FIG. 37 is a plan view illustrating a plane of a display device according to a second modification of the present embodiment. FIG. 38 is a sectional view along XXXVIII-XXXVIII' in FIG. 37. FIG. 39 is a sectional view along XXXIX-XXXIX' in FIG. 37. The same components as those described above in the present embodiment or the modification thereof are denoted by the same reference numerals, and the description thereof will not be repeated.

As illustrated in FIGS. 37 and 38, one of the light emitters 31 faces the second side surface 20D of the second translucent substrate 20. As illustrated in FIG. 38, the light emitter 31 emits the light-source light L to the second side surface 20D of the second translucent substrate 20. The second side surface 20D of the second translucent substrate 20 facing the light emitter 31 serves as a light incident surface. The gap G is provided between the light emitter 31 and the light incident surface. The gap G forms an air layer.

As illustrated in FIG. 38, the light-source light L emitted from the light emitter 31 propagates in a direction away from the second side surface 20D while being reflected by the first principal surface 10A of the first translucent substrate 10 and the first principal surface 20A of the second translucent substrate 20.

As illustrated in FIGS. 37 and 39, the other of the light emitters 31 faces the third side surface 20E of the second translucent substrate 20. As illustrated in FIG. 39, the light emitter 31 emits the light-source light L to the third side surface 20E of the second translucent substrate 20. The third side surface 20E of the second translucent substrate 20 facing the light emitter 31 serves as a light incident surface. The gap G is provided between the light emitter 31 and the light incident surface. The gap G forms an air layer.

As illustrated in FIG. 39, the light-source light L emitted from the light emitter 31 propagates in a direction away from the third side surface 20E while being reflected by the first principal surface 10A of the first translucent substrate 10 and the first principal surface 20A of the second translucent substrate 20.

The display device 1 according to the second modification of the present embodiment includes the first translucent substrate 10, the second translucent substrate 20, the liquid crystal layer 50, and the light emitters 31. One of the two light emitters 31 faces the second side surface 20D of the second translucent substrate 20, and the other of the two light emitters 31 faces the third side surface 20E of the second translucent substrate 20. With this configuration, the light quantity of the in-plane light emitted from the two light emitters 31 and propagating in the display panel 2 increases. The uniformity of the in-plane light propagating in the display panel 2 also increases. The region P1 and the region P2 illustrated in FIG. 6 differ in distance from the light emitter 31, and therefore differ in in-plane light quantity. In contrast, the display device 1 according to the second modification of the present embodiment causes light to propagate from two intersecting directions, thereby reducing the difference in in-plane light quantity.

In the same manner as the present embodiment, the display device 1 according to the second modification of the present embodiment does not include a backlight device or a reflecting plate on the first principal surface 10A side of the first translucent substrate 10 or on the first principal surface 20A side of the second translucent substrate 20. As a result, the background on the first principal surface 20A side of the second translucent substrate 20 is visible from the first principal surface 10A of the first translucent substrate 10, and the background on the first principal surface 10A side of the first translucent substrate 10 is visible from the first principal surface 20A of the second translucent substrate 20.

The preferred embodiment of the present disclosure has been described above. The present disclosure is, however, not limited to the embodiment described above. The content disclosed in the embodiment is merely an example, and can be variously modified within the scope not departing from the gist of the present disclosure. Any modifications appropriately made within the scope not departing from the gist of the present disclosure also naturally belong to the technical scope of the present disclosure. All the technology that can be carried out by those skilled in the art through appropriate design modifications based on the disclosure described above also belongs to the technical scope of the present disclosure as long as including the gist of the present disclosure.

The display panel 2 may be, for example, a passive-matrix panel without any switching element. The passive-matrix panel includes: first electrodes extending in the PX direction in the plan view; second electrodes extending in the PY direction in the plan view; and wiring electrically coupled to the first electrodes or the second electrodes. The first and second electrodes and the wiring are made of, for example, ITO. For example, the first translucent substrate 10 including the first electrodes and the second translucent substrate 20 including the second electrodes face each other with the liquid crystal layer 50 interposed therebetween.

Although the example has been described in which the first and the second orientation films 55 and 56 are vertical orientation films, the first and the second orientation films 55 and 56 may be horizontal orientation films. The first and the second orientation films 55 and 56 only need to have a function to orient monomers in a predetermined direction when polymerizing the monomers. This allows the monomers to become polymers oriented in the predetermined direction. When the first and the second orientation films 55 and 56 are the horizontal orientation films, the direction of the optical axis Ax1 of the bulk 51 is equal to the direction of the optical axis Ax2 of the fine particles 52 and is orthogonal to the PZ direction when no voltage is applied between the pixel electrode 16 and the common electrode 22. The direction orthogonal to the PX direction corresponds to the PZ direction or the PY direction along a side of the first translucent substrate 10 in the plan view.

The higher-level controller 9 illustrated in FIG. 2 may use the central processing unit (CPU) to perform various functions, such as the functions of the analyzer 41, the image output portion 91, and the convergence angle calculator 93. Alternatively, the imaging device 61 may be coupled to the drive circuit 4 through the flexible substrate 95 illustrated in FIG. 1, and the drive circuit 4 may include the convergence angle calculator 93.

The present disclosure includes the following aspects:

(1) A display device comprising:
 a first translucent substrate;
 a second translucent substrate facing the first translucent substrate;
 a liquid crystal layer including polymer dispersed liquid crystal sealed between the first translucent substrate and the second translucent substrate;
 at least one light emitter facing at least one of a side surface of the first translucent substrate or a side surface of the second translucent substrate; and
 a display controller that controls transmittance of light passing through the first translucent substrate and the second translucent substrate, wherein
 a non-light-emitting period in which the at least one light emitter does not emit light is provided between a plurality of light-emitting periods in which the at least one light emitter emits light.

(2) The display device according to (1), wherein
 the first translucent substrate has a first principal surface and a second principal surface that is a plane parallel to the first principal surface,
 the second translucent substrate has a first principal surface and a second principal surface that is a plane parallel to the first principal surface, and
 when the polymer dispersed liquid crystal is in a non-scattering state, a background on the first principal surface side of the second translucent substrate is visible from the first principal surface of the first translucent substrate, or a background on the first principal surface side of the first translucent substrate is visible from the first principal surface of the second translucent substrate.

(3) The display device according to (1) or (2), further comprising a first electrode and a second electrode with the liquid crystal layer interposed therebetween, wherein
 a first period of the light-emitting periods in which the at least one light emitter emits light of a first color is a first sub-frame period; a second period of the light-emitting periods in which the at least one light emitter emits light of a second color is a second sub-frame period; and a third period of the light-emitting periods in which the at least one light emitter emits light of a third color is a third sub-frame period; and
 the display controller sequentially applies a first voltage to the first electrode according to a gradation value of a color of an image in synchronization with the emission of the light of the first color, the light of the second color, or the light of the third color, and applies a second voltage to the first electrode during the non-light-emitting period.

(4) The display device according to (3), wherein the non-light-emitting period is provided between the first sub-frame period and the second sub-frame period, between the second sub-frame period and the third sub-frame period, and between the third sub-frame period and the first sub-frame period.

(5) The display device according to (3) or (4), wherein a processing region in which the transmittance of a region surrounding the image is controlled is an entire display region excluding the image.

(6) The display device according to (3) or (4), wherein a processing region in which the transmittance of a region surrounding the image is controlled is a region overlapping with the image and excluding the image, among a plurality of regions obtained by dividing the display region.

(7) The display device according to (3) or (4), wherein processing regions in which the transmittance of a region surrounding the image is controlled are regions in a column to which the image belongs, the regions excluding the image, among a plurality of regions obtained by dividing the display region.

(8) The display device according to (3) or (4), wherein processing regions in which the transmittance of a region surrounding the image is controlled are regions in a row to which the image belongs, the regions excluding the image, among a plurality of regions obtained by dividing the display region.

(9) The display device according to (3) or (4), wherein a processing region in which the transmittance of a region surrounding the image is controlled corresponds to a range having a predetermined width from an outline of the image.

(10) The display device according to (9), wherein the display controller performs control to make the transmittance in the processing region higher as the processing region becomes farther from the image.

(11) The display device according to (3) or (4), wherein a processing region in which the transmittance of a region surrounding the image is controlled includes:
 a first region having a maximum length in a first direction of the image and a maximum length in a second direction orthogonal to the first direction, the first region excluding the image; and
 a second region having a predetermined width from an outline of the first region.

(12) The display device according to (11), wherein the display controller performs control to make the transmittance in the second region higher as the second region becomes farther from the image.

(13) The display device according to (12), wherein the display controller performs control to make the transmittance in the first region higher as the first region becomes farther from the image.

(14) The display device according to any one of (1) to (13), wherein the display controller controls the transmittance of at least a region surrounding an image according to a gazing distance.

(15) The display device according to (14), wherein the display controller applies the second voltage to the first electrode according to the gazing distance during the non-light-emitting period.

(16) The display device according to (14) or (15), further comprising:
 an imaging device that captures an image on a viewer side; and
 a convergence angle calculator that calculates an angle of convergence from the image on the viewer side, wherein
 the display controller calculates the gazing distance based on the angle of convergence.

What is claimed is:

1. A display device comprising:
   a first translucent substrate;
   a second translucent substrate facing the first translucent substrate;
   a liquid crystal layer including polymer dispersed liquid crystal sealed between the first translucent substrate and the second translucent substrate;
   at least one light emitter facing at least one of a side surface of the first translucent substrate or a side surface of the second translucent substrate; and
   a display controller that controls transmittance of light passing through the first translucent substrate and the second translucent substrate; and
   a first electrode and a second electrode with the liquid crystal layer interposed therebetween, wherein
   a non-light-emitting period in which the at least one light emitter does not emit light is provided between a plurality of light-emitting periods in which the at least one light emitter emits light,
   a first period of the light-emitting periods in which the at least one light emitter emits light of a first color is a first sub-frame period; a second period of the light-emitting periods in which the at least one light emitter emits light of a second color is a second sub-frame period; and a third period of the light-emitting periods in which the at least one light emitter emits light of a third color is a third sub-frame period, and
   the display controller sequentially applies a first voltage to the first electrode according to a gradation value of a color of an image in synchronization with the emission of the light of the first color, the light of the second color, or the light of the third color, and applies a second voltage to the first electrode during the non-light-emitting period.

2. The display device according to claim 1, wherein
   the first translucent substrate has a first principal surface and a second principal surface that is a plane parallel to the first principal surface,
   the second translucent substrate has a first principal surface and a second principal surface that is a plane parallel to the first principal surface, and
   when the polymer dispersed liquid crystal is in a non-scattering state, a background on the first principal surface side of the second translucent substrate is visible from the first principal surface of the first translucent substrate, or a background on the first principal surface side of the first translucent substrate is visible from the first principal surface of the second translucent substrate.

3. The display device according to claim 1, wherein the non-light-emitting period is provided between the first sub-frame period and the second sub-frame period, between the second sub-frame period and the third sub-frame period, and between the third sub-frame period and the first sub-frame period.

4. The display device according to claim 1, wherein a processing region in which the transmittance of a region surrounding the image is controlled is an entire display region excluding the image.

5. The display device according to claim 1, wherein a processing region in which the transmittance of a region surrounding the image is controlled is a region overlapping with the image and excluding the image, among a plurality of regions obtained by dividing the display region.

6. The display device according to claim 1, wherein processing regions in which the transmittance of a region surrounding the image is controlled are regions in a column to which the image belongs, the regions excluding the image, among a plurality of regions obtained by dividing the display region.

7. The display device according to claim 1, wherein processing regions in which the transmittance of a region surrounding the image is controlled are regions in a row to which the image belongs, the regions excluding the image, among a plurality of regions obtained by dividing the display region.

8. The display device according to claim 1, wherein a processing region in which the transmittance of a region surrounding the image is controlled corresponds to a range having a predetermined width from an outline of the image.

9. The display device according to claim 8, wherein the display controller performs control to make the transmittance in the processing region higher as the processing region becomes farther from the image.

10. The display device according to claim 1, wherein a processing region in which the transmittance of a region surrounding the image is controlled includes:
    a first region having a maximum length in a first direction of the image and a maximum length in a second direction orthogonal to the first direction, the first region excluding the image; and
    a second region having a predetermined width from an outline of the first region.

11. The display device according to claim 10, wherein the display controller performs control to make the transmittance in the second region higher as the second region becomes farther from the image.

12. The display device according to claim 11, wherein the display controller performs control to make the transmittance in the first region higher as the first region becomes farther from the image.

13. The display device according to claim 1, wherein the display controller controls the transmittance of at least a region surrounding an image according to a gazing distance.

14. The display device according to claim 13, wherein the display controller applies the second voltage to the first electrode according to the gazing distance during the non-light-emitting period.

15. The display device according to claim 13, further comprising:
    an imaging device that captures an image on a viewer side; and
    a convergence angle calculator that calculates an angle of convergence from the image on the viewer side, wherein
    the display controller calculates the gazing distance based on the angle of convergence.

* * * * *